US010318295B2

(12) United States Patent
Doshi et al.

(10) Patent No.: US 10,318,295 B2
(45) Date of Patent: Jun. 11, 2019

(54) TRANSACTION END PLUS COMMIT TO PERSISTENCE INSTRUCTIONS, PROCESSORS, METHODS, AND SYSTEMS

(71) Applicant: Intel Corporation, Santa Clara, CA (US)

(72) Inventors: Kshitij A. Doshi, Chandler, AZ (US); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 202 days.

(21) Appl. No.: 14/979,083

(22) Filed: Dec. 22, 2015

(65) Prior Publication Data

US 2017/0177365 A1   Jun. 22, 2017

(51) Int. Cl.
| | |
|---|---|
| *G06F 9/312* | (2018.01) |
| *G06F 9/30* | (2018.01) |
| *G06F 12/0891* | (2016.01) |
| *G06F 9/46* | (2006.01) |
| *G06F 12/1009* | (2016.01) |
| *G06F 12/1027* | (2016.01) |
| *G06F 12/0842* | (2016.01) |

(52) U.S. Cl.
CPC ........ *G06F 9/30087* (2013.01); *G06F 9/3016* (2013.01); *G06F 9/30043* (2013.01); *G06F 9/30101* (2013.01); *G06F 9/467* (2013.01); *G06F 12/0891* (2013.01); *G06F 12/0842* (2013.01); *G06F 12/1009* (2013.01); *G06F 12/1027* (2013.01)

(58) Field of Classification Search
CPC ............ G06F 9/30043; G06F 9/30087; G06F 9/3834; G06F 9/466; G06F 9/467
See application file for complete search history.

(56) References Cited

U.S. PATENT DOCUMENTS 5,862,318 A * 1/1999 Habben ............... G06F 11/1471
707/999.202
6,035,379 A * 3/2000 Raju ................... G06F 11/1474
707/999.202

(Continued)

OTHER PUBLICATIONS

Doshi, Kshitij A., "Making Volatile Isolation Transactions Failure-Atomic in Non-Volatile Memory", U.S. Appl. No. 14/864,583, filed Sep. 24, 2015, 26 pages.

(Continued)

*Primary Examiner* — David J. Huisman
(74) *Attorney, Agent, or Firm* — NDWE, LLP

(57) ABSTRACT

A processor of an aspect includes a decode unit to decode a transaction end plus commit to persistence instruction. The processor also includes an execution unit coupled with the decode unit. The execution unit, in response to the instruction, is to atomically ensure that data associated with all prior store to memory operations made to a persistent memory, which are to have been accepted to memory when performance of the instruction begins, but which are not necessarily to have been stored in the persistent memory when the performance of the instruction begins, are to be stored in the persistent memory before the instruction becomes globally visible. The execution unit, in response to the instruction, is also to atomically end a transactional memory transaction before the instruction becomes globally visible.

11 Claims, 15 Drawing Sheets

(56) References Cited

U.S. PATENT DOCUMENTS

| | | | |
|---|---|---|---|
| 6,799,188 B2* | 9/2004 | Weedon | G06F 9/466 |
| 9,696,927 B2* | 7/2017 | Cain | G06F 3/0622 |
| 9,715,450 B2* | 7/2017 | Ma | G06F 12/0811 |
| 9,720,837 B2* | 8/2017 | Bradbury | G06F 12/0837 |
| 9,740,614 B2* | 8/2017 | Bradbury | G06F 12/0815 |
| 2002/0091702 A1* | 7/2002 | Mullins | G06F 17/30557 |
| 2005/0203961 A1 | 9/2005 | Mehra et al. | |
| 2009/0043845 A1* | 2/2009 | Garza | G06Q 10/10 709/204 |
| 2012/0144126 A1* | 6/2012 | Nimmala | G06F 12/084 711/141 |
| 2013/0275715 A1 | 10/2013 | Caprioli et al. | |
| 2013/0290243 A1* | 10/2013 | Hazel | G06F 17/30377 707/607 |
| 2013/0326150 A1 | 12/2013 | Phelan et al. | |
| 2013/0339688 A1* | 12/2013 | Busaba | G06F 9/44 712/233 |
| 2014/0007066 A1 | 1/2014 | Kanhere et al. | |
| 2014/0059333 A1 | 2/2014 | Dixon et al. | |
| 2014/0136786 A1 | 5/2014 | Carpenter et al. | |
| 2014/0156933 A1 | 6/2014 | Shaikh et al. | |
| 2014/0281240 A1 | 9/2014 | Willhalm et al. | |
| 2014/0297595 A1 | 10/2014 | Larson et al. | |
| 2014/0379996 A1 | 12/2014 | Dixon et al. | |
| 2015/0006496 A1 | 1/2015 | Parthasarathy et al. | |
| 2015/0006834 A1 | 1/2015 | Dulloor et al. | |
| 2015/0032998 A1 | 1/2015 | Parthasarathy et al. | |
| 2016/0342351 A1* | 11/2016 | Li | G06F 11/1471 |

OTHER PUBLICATIONS

International Search Report and Written Opinion received for PCT Patent Application No. PCT/US2016/062826, dated Feb. 17, 2017, 12 pages.

Chakrabarti et al., "Atlas: Leveraging Locks for Non-volatile Memory Consistency", Feb. 21, 2014, pp. 1-13.

Chatzistergiou et al., "REWIND: Recovery Write-Ahead System for In-Memory Non-Volatile Data-Structures", Proceedings of the VLDB Endowment, vol. 8, No. 5, Aug. 31-Sep. 4, 2015, pp. 497-508.

Dulloor et al., "System Software for Persistent Memory", Apr. 13-16, 2014, 15 pages.

Giles et al., "Wrapping Operations for Atomicity and Durability", A Position Paper on How to Simplify NVM Programming for Extreme Performance, 2014, 2 pages.

Intel, "Intel 64 and IA-32 Architectures Software Developer's Manual", Combined vols. 1, 2A, 2B, 2C, 3A, 3B and 3C, Order No. 325462-051US, Jun. 2014, pp. 15-1-15-8, 16-1-16-2, 4-568-4-570, 4-573 and 4-574.

Intel, "Intel Architecture Instruction Set Extensions Programming Reference", Oct. 2014, 12 pages.

Volos et al., "Mnemosyne: Lightweight Persistent Memory", Computer Sciences Department, University of Wisconsin-Madison, Skype Limited, Mar. 5-11, 2011, 13 pages.

Yen et al., "LogTM-SE: Decoupling Hardware Transactional Memory from Caches", Appears in the proceedings of the 13th Annual International Symposium on High Performance Computer Architecture (HPCA-13) Phoenix, AZ, Feb. 10-14, 2007, 12 pages.

* cited by examiner

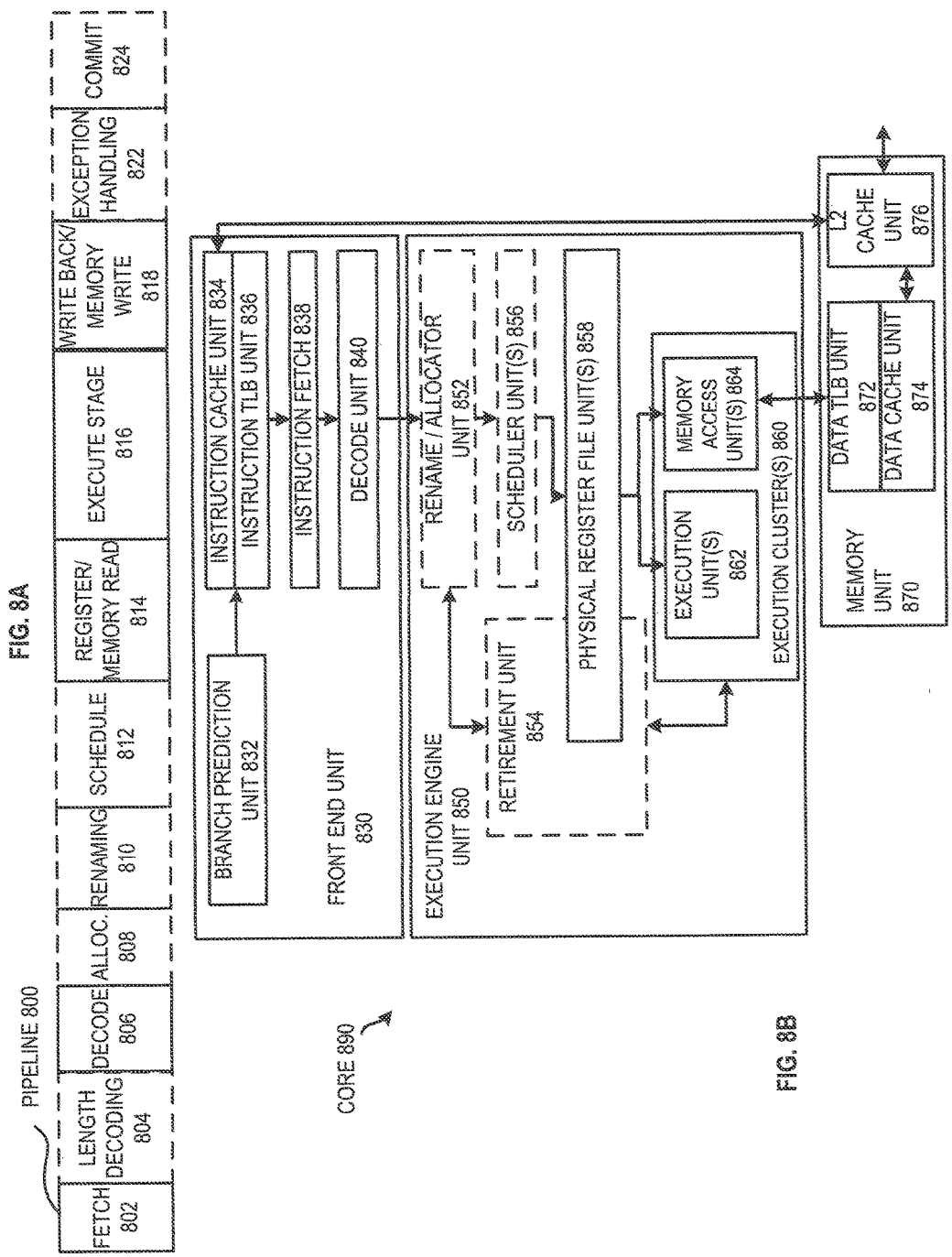

TRANSACTION END PLUS COMMIT TO PERSISTENCE INSTRUCTIONS, PROCESSORS, METHODS, AND SYSTEMS

BACKGROUND

Technical Field

Embodiments described herein generally relate to processors. In particular, embodiments described herein generally relate to processors having architectural support for persistent memory.

Background Information

Processors are often used in computer systems and other electronic devices that have a main memory to store data. The processors may execute instructions to access data in the main memory. For example, processors may execute load instructions to load or read data from the main memory and/or store instructions to write or otherwise store data to the main memory. The main memory is commonly implemented with dynamic random access memory (DRAM) or other volatile memory. One challenge in such computer systems and other electronic devices is that power failures, system crashes, and various other types of errors can occur in which data stored in the DRAM or other volatile memory is lost.

BRIEF DESCRIPTION OF THE DRAWINGS

The invention may best be understood by referring to the following description and accompanying drawings that are used to illustrate embodiments. In the drawings:

FIG. 8A is a block diagram illustrating an embodiment of an in-order pipeline and an embodiment of a register renaming out-of-order issue/execution pipeline.

FIG. 8B is a block diagram of an embodiment of processor core including a front end unit coupled to an execution engine unit and both coupled to a memory unit.

DETAILED DESCRIPTION OF EMBODIMENTS

Disclosed herein are transaction end plus commit to persistence instructions, processors to perform the instructions, methods performed by the processors when performing the instructions, systems incorporating one or more processors to perform the instructions, and programs (or machine readable storage mediums storing programs) that include the instructions. In some embodiments, a processor may include a unit, component, logic, or module (e.g., a decode unit) to receive the instruction, and one or more units, components, logics, or modules (e.g., an execution unit) in response to the instruction to ensure that data of certain prior store to persistent memory operations with a certain characteristic (e.g., those which have been accepted to memory) has been stored persistently, and end a transactional memory transaction. In the following description, numerous specific details are set forth (e.g., specific instruction operations, processor configurations, microarchitectural details, sequences of operations, example uses for logging, etc.). However, embodiments may be practiced without these specific details. In other instances, well-known circuits, structures and techniques have not been shown in detail to avoid obscuring the understanding of the description.

Figure 1:
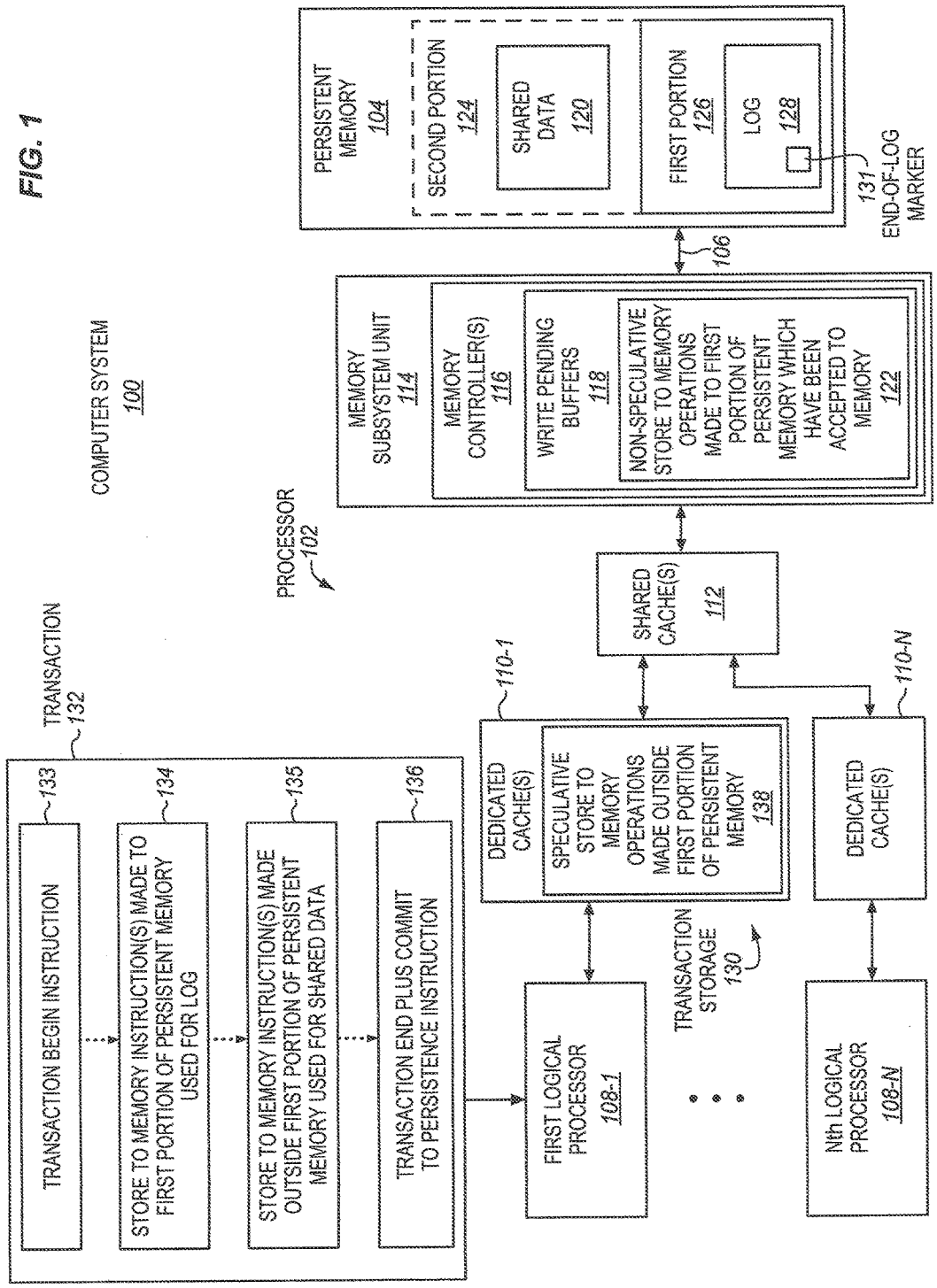
FIG. 1 is a block diagram of an embodiment of a computer system in which some embodiments of the invention may be implemented.

FIG. 1 is a block diagram of an embodiment of a computer system 100 in which embodiments of the invention may be implemented. In various embodiments, the computer system may be a desktop computer, a laptop computer, a notebook computer, a tablet computer, a netbook, a smartphone, a cellular phone, a server, a network device (e.g., a router, switch, etc.), a media player, a smart television, a nettop, a set-top box, a video game controller, or other type of electronic device. The computer system includes a processor 102 and a persistent memory 104 coupled with the processor. The processor and the persistent memory may be coupled, or otherwise in communication with one another, by one or more conventional coupling mechanisms 106 (e.g., through one or more buses, hubs, memory controllers, chipset components, or the like).

The processor 102 includes a plurality of processing elements or logical processors 108. In the illustration, a first logical processor 108-1 through an Nth logical processor 108-N are shown, where the number of logical processors (N) may represent any desired number appropriate for the particular implementation. Possible examples of the number N include, but are not limited to, 2, 3, 4, 5, 6, 7, 8, 16, 20, 32, 50, 64, 100, 128, or other numbers fewer or more than 128. Examples of suitable logical processors or processor elements include, but are not limited to, cores, hardware threads, thread units, thread slots, logic operative to store a context or architectural state and a program counter or instruction pointer, logic operative to store state and be independently associated with code, and the like.

The first logical processor 108-1 is coupled with a first set of one or more levels of dedicated caches 110-1. Likewise, the second logical processor 108-N is coupled with a second set of one or more levels of dedicated caches 110-N. The processor also optionally has one or more levels of shared caches 112 that are relatively farther from the execution units than the dedicated caches 110. The scope of the invention is not limited to any known number or arrangement of caches. Broadly, in various embodiments, the processor may have zero or more dedicated and zero or more shared caches. When the processor wants to store data to the persistent memory, the data may often first be stored in the caches.

Referring again to FIG. 1, the computer system has a memory subsystem unit 114 that includes one or more memory controllers 116. In some embodiments, the computer system may include only a single memory controller. In other embodiments, the computer system may include two or more memory controllers. In one aspect, the memory controller(s) may be on-die memory controllers that are monolithically located on the same die as the processor (e.g., on-die with the logical processors including decoders and execution units thereof). In another aspect, the memory controller(s) may optionally be located off-die from the logical processors (e.g., in a separate die of a chipset component). The memory subsystem unit and/or the memory controller(s) may be operative to be coupled with the persistent memory 104 (e.g., through the coupling mechanism 106). The memory controller(s) have write pending buffers 118 to temporarily buffer or otherwise store data that is in the process of being stored or written to the persistent memory.

The computer system also includes the persistent memory 104. Although not shown, the computer system may also optionally have non-persistent memory (e.g., DRAM or other types of memory suitable for main or primary memory). As its name implies, the persistent memory may be operative to store data persistently or durably. In some embodiments, the persistently stored data may not be lost even in the event of a power loss, operating system failure, system crash, system reboot, and the like. Examples of suitable forms of persistent memory include, but are not limited to, non-volatile memory or storage, battery (or other suitable power source) backed volatile memory or storage, and combinations thereof. Typically, volatile memory or storage loses its stored data or contents when power is not supplied for a relatively short period of time. However, backing the volatile memory or storage with a battery (or other reliable backup power source such as capacitance, fuel cell, etc.) may help to make the volatile memory be sufficiently persistent to be considered persistent memory. Non-volatile memories and storage devices are natively operative to retain their stored data or contents even after relatively long periods with no power applied (e.g., typically for at least a day or often much longer without power).

Specific examples of suitable types of memory and/or storage for the persistent memory 104 include, but are not limited to, battery (or other suitable power source) backed dynamic random access memory (DRAM) and/or other forms of volatile memory and non-volatile memory or storage. Examples of suitable forms of natively non-volatile memory or storage include, but are not limited to, those based on phase change memory (PCM), memristors (e.g., non-linear passive two-terminal electrical components relating electric charge and magnetic flux linkage), and spin-transfer torque memory (e.g., that utilizes an effect in which the orientation of a magnetic layer in a magnetic tunnel junction or spin valve can be modified using a spin-polarized current), and combinations thereof, to name just a few examples. Other technologies developed in the future, which are either extensions or improvements of these technologies, or different technologies entirely, are also potentially suitable. Also, other forms of non-volatile memory commonly used as secondary backing memory in computer systems, are also potentially suitable. Examples include, but are not limited to, hard disks, magnetic tape, other types of magnetic storage devices, various types of read-only memory (ROM), optical discs, ferroelectric RAM (F-RAM), and magnetoresistive RAM. Although, such forms of memory commonly have slower access speeds and/or other characteristics that tend to favor the aforementioned newer types of non-volatile memory. The scope of the invention is not limited to any particular type of persistent memory.

In some embodiments, the persistent memory, either alone or in combination with an optional volatile memory (not shown), may be used to implement the primary or main memory of the computer system. In some embodiments, the persistent memory, either alone or in combination with the optional volatile memory, may be part of the processors addressable physical address space. Software may be able to access the persistent memory by performing at least user-level load instructions, user-level store instructions, and other instructions of an instruction set of the processor, similarly to the way such instructions are able to access volatile main/primary memory (e.g., DRAM). In some embodiments, the persistent memory may be byte-addressable, as opposed to only being only page/block addressable. In some embodiments, the persistent memory may optionally be directly coupled with a processor memory bus. In some embodiments, accesses to the persistent memory may be subject to the same or a substantially similar processor memory model (e.g., with respect to the ability to be cached, coherency, processor memory ordering, memory types, etc.) as accesses to volatile main/primary memory (e.g., DRAM).

In some embodiments, stores to the persistent memory may share at least some of the same volatile micro-architectural resources of the processor and/or computer system as stores to volatile main/primary memory (e.g., DRAM), such as, for example, processor store buffers, coherency caches (e.g., L1, L2, etc.), any optional memory-side caches, on-chip and off-chip interconnect buffers, memory controller write buffers (e.g., the write-pending buffers 118), and the like. In some embodiments, the persistent memory may be identified to system software as being persistent memory. In some embodiments, a basic input-output system (BIOS) may support the persistent memory, for example to configure certain components (e.g., memory controller(s), memory devices (e.g., dual in-line memory modules (DIMMs)), system address decoders, etc.) to utilize the persistent memory, and to identify the persistent memory as being distinct from non-persistent memory to system software (e.g., an operating system, virtual machine monitor, etc.).

The ability to store data persistently or durably in the persistent memory 104 is useful for various applications and/or implementations. For example, in some applications and/or implementations (e.g., database applications) it may be important not to lose data even in the event of a power failure, system crash, reboot, or the like. In such applications/implementations, writes are often performed to shared data 120 (e.g., a shared data structure), and it is commonly advantageous to implement certain guarantees with respect to such shared data. As one example, it is often useful to provide ACID (atomicity, consistency, isolation, durability) guarantees. The persistent memory may help in this regard (e.g., with regard to durability).

However, ensuring that data is stored persistently in the persistent memory 104 may tend to pose additional challenges. For one thing, the processor may have various intermediate volatile microarchitectural components and/or storage where data associated with store to memory instructions/operations may be temporarily stored on its way to the persistent memory. Possible examples of such volatile components and/or storage include, but are not limited to, processor store buffers, coherency cache(s) (e.g., the caches 110, 112), intermediate volatile storage in the memory subsystem unit 114 (e.g., write-pending buffers 118 of the memory controller(s)), any optional memory-side caches, on-chip interconnect buffers, and the like. Such volatile components/storage are generally not able to retain their data or contents in the event of a power failure, operating system failure, system crash, reboot, or the like. The data being stored toward the persistent memory may not actually become persistent or durable until it actually is stored in the persistent memory (or at least in an intermediate power-fail protected storage device or buffer, if one is optionally implemented). As used herein, storing data in the persistent memory encompasses storing the data in such an optional intermediate power-failure protected storage device or buffer, which is also considered sufficiently persistent for the particular implementation. As a result, if a power failure, system crash, operating system failure, reboot, or the like were to occur, while the data is stored in such volatile components or storage (e.g., in the write-pending buffers 118 in the memory controller(s) 116), the data would typically be lost without the desired persistency having been achieved.

As mentioned, the processor may have from multiple (i.e., at least two) to potentially/optionally a large number of logical processors 108. One challenge that may be encountered, in systems having from multiple to potentially/optionally a large number of logical processors, is a tendency for increased sharing of data among the logical processors and/or a greater need for synchronizing or otherwise controlling concurrent accesses to the shared data among the logical processors. During operation two or more of the logical processors 108 may access the shared data 120. Accesses to the shared data by the different logical processors in the system generally need to be controlled to prevent conflicting accesses to the data that could cause erroneous results. In some embodiments, the shared data may optionally be stored in the persistent memory, specifically in a second portion 124 of the persistent memory. Alternatively, in other embodiments, the shared data may optionally be stored elsewhere, for example, in DRAM or other volatile memory (not shown).

One way to synchronize or otherwise control concurrent accesses to the shared data 120 involves using locks or semaphores to guarantee mutual exclusion of accesses across multiple logical processors. The locks or semaphores may be used to serialize accesses to the shared data. For example, a given logical processor may acquire a lock corresponding to a given data in order to prevent other logical processors from modifying the given data, atomically modify the given data after it has acquired the lock, and then release the lock so that other logical processors can access the modified data. However, such use of semaphores or locks may tend to have certain drawbacks, such as, for example, inefficiencies due to unnecessary serialization of execution, complexities in programming associated with managing the locks, false contention for the locks among the logical processors, and the like. In addition, such challenges generally tend to increase with increasing numbers of logical processors.

Accordingly, approaches that help to reduce such use of locks or semaphores may tend to be beneficial. In some embodiments, the processor 102 and/or at least the first logical processor 108-1 may be operative to support transactional execution. Transactional execution is also sometimes referred to as transactional memory. Transactional execution represents an approach to control concurrent accesses to the shared data 120 by the logical processors 108, which may help to reduce the use of locks or semaphores. One suitable example of transactional execution, for some embodiments, is Restricted Transactional Memory (RTM) form of transactional execution of Intel® Transactional Synchronization Extensions (Intel® TSX) forms of transactional execution), although the scope of the invention is not so limited. The transactional execution as described herein may in some embodiments have any one or more or optionally substantially all of the features of RTM form of transactional execution, although the scope of the invention is not so limited. Other forms of transactional execution are also suitable.

During operation, the first logical processor 108-1 may be operative to perform a transaction 132. The transaction may represent a programmer specified critical section or portion of code. The transactional execution may be operative to allow a group of instructions and/or operations within the transaction (e.g., including instructions 135) to be transparently performed atomically. The atomicity implies in part that these instructions and/or operations (e.g., instructions 135) are either performed fully, or not at all, and not performed partially. Within the transaction 132, data that would otherwise be protected by a lock may only be read, but not written within the transaction non-speculatively or in a way that is globally visible, and the lock may not actually be acquired. If the transactional execution is successful, then writes to the data by instructions within the transaction may be performed atomically, without the lock needing to have been acquired. This may help to improve performance by reducing lock waiting overhead, latencies, and serialization, by providing higher concurrencies, etc. Also, avoiding needing to manage or handle the locks may help to simplify programming, compilers, etc.

Referring again to FIG. 1, the transaction includes a transaction begin instruction 133. The transaction begin instruction may be operative to specify, demarcate, or otherwise indicate the beginning of the transaction. One specific example of a suitable transaction begin instruction is the XBEGIN instruction in the RTM form of transactional execution, although the scope of the invention is not so limited. The XBEGIN instruction when performed may be operative to cause the processor to transition the execution to transactional execution (e.g., turn on transactional execution), if it has not already transitioned to transactional execution. The XBEGIN instruction when performed may also be operative to cause the processor to increment, increase, or otherwise update a transaction nest count, if nested transactions are supported and/or used for the particular implementation. The XBEGIN instruction may also specify or otherwise indicate an operand to provide a relative offset to compute a fallback instruction address at which execution may be resumed if the transaction does not complete successfully and/or in the event of a transaction abort. In other embodiments, the transaction begin instruction 133 may not be the specific XBEGIN instruction, but rather may have any one or more of the aforementioned features of the XBEGIN instruction, or similar features, potentially combined with additional features. The scope of the invention is not limited to any known transaction begin instruction or its operations.

The transaction also includes one or more store to memory instructions 134, which in the illustrated example are being made to a first portion 126 of the persistent memory. In some embodiments, the first portion 126 may optionally be used to store at least one log 128 (e.g., an undo log, a redo log, or other write-ahead log), which may have an end-of-log marker 131. The transaction also includes one or more store to memory instructions 135, which in the illustrated example are being made to outside of the first portion 126 of the persistent memory, for example, optionally to a second portion 124 of the persistent memory. In some embodiments, the second portion 124 may optionally be used to store the shared data 120. Alternatively, the shared data may optionally be stored elsewhere besides in the persistent memory, such as, for example, optionally in DRAM or other non-persistent memory. However, modifying the shared data in place in the persistent memory may tend to offer certain advantages for certain implementations (e.g., including avoiding a need to subsequently propagate the modifications to persistent memory).

Write-ahead logging is a technique to help achieve atomicity and persistency when modifying data (e.g., the shared data 120). Write-ahead logs, such as, for example, redo logs and/or undo logs, are often used in database and other applications to help maintain data integrity. In write-ahead logging, data and/or modifications to the shared data 120 may be ordered chronologically behind corresponding modifications made to and/or reflected in the write-ahead log 128. In this way, if a power failure, system crash, or other such event occurs, before the changes are actually completed to the shared data 120, the log 128 may be used to recover the shared data 120 to a known non-corrupted state (e.g., by using the log to redo or undo changes to the shared data). In some cases, two or more different types of logs (e.g., both a redo log and an undo log) may optionally be used to provide additional protection. Such use of at least one log may help to avoid unrecoverable loss and/or corruption of data in the event of a power failure, system crash, or various other types of failures.

As shown, in some embodiments, one or more speculative store to memory operations 138, which in the illustrated example are being made to outside of the first portion 126 of the persistent memory (e.g., to the second portion 124 which may optionally be used to store the shared data 120), may be speculative and transactionally queued, buffered, or otherwise stored in a transaction queue, buffer, or other storage 130. The operations 138 may correspond to the instructions 135. As shown, in some embodiments, the transaction storage 130 may optionally be implemented in one of the dedicated cache(s), such as, for example, in the L1 cache 110-1 dedicated to the first logical processor 108-1. Alternatively, the transaction storage may optionally be implemented in a shared cache (e.g., one of the shared cache(s) 112), a dedicated storage, other buffers or storage of the processor, etc. These speculative store to memory operations 138 may be transactionally stored, and then either atomically committed or aborted, depending on whether transaction succeeds or not.

Referring again to FIG. 1, one or more non-speculative store to memory operations 122 correspond to the instructions 134 of the transaction. In some embodiments, these non-speculative store to memory operation(s) 122, which in the illustrated example are being made to the first portion 126 of the persistent memory (e.g., which may optionally be used for the log 128), may be non-speculative and/or may not be stored in the transaction storage 130, even though they are being performed due to the instructions 134 of the transaction. Rather, in some embodiments, these non-speculative store to memory operations 122 may be allowed to bypass the transaction storage 130, and proceed to be accepted to memory non-transactionally and/or non-speculatively before the transaction 132 successfully completes and/or whether or not the transaction ends and/or successfully completes. As shown, these non-speculative, non-transactional store to memory operation(s) 122 may be stored in the memory subsystem unit (e.g., in the write pending buffers 118 of the memory controller(s)), before the transaction successfully completes and/or whether or not the transaction successfully completes. Moreover, these store to memory operation(s) may optionally be stored in the various other previously described volatile micro-architectural structures of the processor on their way to the persistent memory before the transaction completes successfully and/or whether or not the transaction completes successfully. By way of example, these store to memory operations 122 may bypass or pass through (e.g., be evicted from) the cache(s) 110, 112 into the memory subsystem unit 114, or cache line flush or cache line write back instructions (e.g., of the transaction 132, which for simplicity are not shown) may be performed to flush or write back these store to memory operations to the memory subsystem unit 114. Thus, the non-speculative store to memory operation(s) 122, which may optionally be made to the log 128 and/or to the first portion 126 of the persistent memory, may be performed non-speculatively and non-transactionally, whereas the speculative store to memory operation(s) 138, which may optionally be made to the shared data 120 and/or optionally outside the first portion 126 of the persistent memory, may be performed speculatively and transactionally.

Referring again to FIG. 1, the transaction 132 also includes an embodiment of a transaction end plus commit to persistence instruction 136. In some embodiments, the transaction end plus commit to persistence instruction 136 when performed may be operative to cause the processor 102 to ensure that at least the non-speculative store to memory operation(s) 122, which are stored within the memory subsystem unit 114 and/or have otherwise been accepted to memory, are stored in the persistent memory 104 (e.g., inclusive of an optional power-failure backed intermediate buffer if one is implemented) before the transaction end plus commit to persistence instruction 136 completes and/or is globally visible, and further ensure that after the instruction 136 completes and/or is globally visible the transaction is guaranteed not to abort.

In some embodiments, the transaction end plus commit to persistence instruction 136 when performed may be operative to cause the processor 102 to atomically: (1) optionally store a value to a destination storage location indicated by the transaction end plus commit to persistence instruction (e.g., specified by an operand thereof); (2) ensure that all prior store to memory operations made to a persistent memory (e.g., including the optional aforementioned store of the value if it is optionally implemented), which are to have been accepted to memory and/or passed a last level cache when performance of the instruction begins, but which are not necessarily to have been stored in the persistent memory when the performance of the instruction begins, are to be stored in the persistent memory before the instruction becomes globally visible and/or commits; and (3) end a transactional memory transaction before the instruction becomes globally visible and/or commits. In some embodiments, the store of the value to the destination storage location may be used to optionally non-speculatively write an end-of-log marker 131, which may be indicated as the destination storage location by the instruction, in the log 128. However, as will be discussed further below, storing the value to the destination storage location within the performance of the transaction end plus commit to persistence instruction is optional and thus not required (e.g., a separate store instruction may optionally be used to write the end-of-log marker, the instruction may be used for a purpose other than redo and/or undo logging, etc.).

In some embodiments, ending the transaction may include attempting to commit the transaction 132, and either committing the transaction, or aborting the transaction. If the transaction 132 does not complete successfully, the processor may perform a transactional abort. When the transactional abort is performed, the speculative store to memory operation(s) 138 stored in the transaction storage 130 may not be committed, but rather they may be discarded or otherwise not performed so that they are never visible to other logical processors. In some embodiments, on-die hardware transactional memory logic may discard these speculative store to memory operation(s) 138. In some embodiments, the processor may also restore the architectural state to appear as if the transaction had never occurred. Accordingly, the transactional execution may natively provide an undo capability, which may allow speculatively or transactionally performed updates to memory to be undone, without ever being visible to other logical processors, in the event of a transaction abort. However, the non-speculative and/or non-transactional store to memory operation(s) 122 may still be performed irrespective of whether the transaction 132 commits or is aborted. In addition, the transaction end plus commit to persistence instruction 136 when performed may be operative to cause the processor to ensure that such non-speculative store to memory operations 122 are persistently committed before it retires or otherwise commits. In one example use, this may help to ensure that changes to the log 128 being made by the non-speculative store operation(s) 122 have been committed to persistence, before corresponding changes to the shared data 120 being made by the speculative store operation(s) 138 are made to the shared data.

There are various possible reasons to abort a transaction. One possible reason to abort the transaction is due to detection of a data conflict or a conflicting access to the shared data (e.g., due to another logical processor). Memory addresses read from within the transaction may constitute the read-set of the transaction. Memory addresses written to within the transaction may constitute the write-set of the transaction. In one aspect, a data conflict may be detected if another logical processor either reads a location that is part of the transaction's write-set and/or writes a location that is a part of either the read-set or write-set of the transaction. Commonly, the processor may include on-die memory access monitor hardware and/or other logic to autonomously monitor memory accesses and detect such conflicts. Cache line granularities or other granularities may optionally be used.

In some embodiments, if such a data conflict occurs at any point before starting to perform the transaction end plus commit to persistence instruction 136, then the transaction may be aborted and not be made globally visible. Moreover, in some embodiments, if such a data conflict occurs after starting to perform the transaction end plus commit to persistence instruction 136, but before the value has been stored in the destination storage location (e.g., an end-of-log marker 331 has been stored persistently in the log 128), then the transaction may also be aborted and not be made globally visible. However, in some embodiments, if such a data conflict occurs after starting to perform the transaction end plus commit to persistence instruction 136, and after the value has been stored in the destination storage location (e.g., the end-of-log marker 331 has been stored persistently in the log 128), then the transaction may not be aborted but rather may be completed and made globally visible. Since the end of transaction marker may be stored persistently, the transaction may be committed so that its changes are globally visible. The conflicting access (e.g., a conflicting transaction) may either be aborted, or it may wait for the transaction end plus commit to persistence instruction to complete and thereafter obtain a copy of the modified data associated with the data conflict once the first transaction has been committed.

Another possible reason for a transaction abort is due to insufficient transactional resources. Yet another possible reason for a transaction abort is certain types of exceptions or other system events. A further possible reason for a transaction abort is performance of a transaction abort instruction (e.g., an XABORT instruction in RTM form of transactional execution of Intel® TSX forms of transactional execution). Embodiments may support any one or more of these various reasons to abort a transaction as well as other reasons desired for the particular implementation. In some embodiments, on-die hardware and/or other on-die logic of the processor may autonomously be operative to detect transactional abort events or conditions.

Conversely, if no transaction abort event is detected, then the transaction end plus commit to persistence instruction 136 may be operative to cause the processor 102 to commit the transaction 132. In some embodiments, the transaction may be committed by atomically performing all the (e.g., now non-speculative) store to memory operation(s) 138 so that they become visible to other logical processors (e.g., become globally visible). As mentioned, atomicity implies performing either all of these store to memory operation(s) 138, or none of them, but not only some of them. In addition, in some embodiments, these store to memory operation(s) 138 may be performed substantially instantaneously when viewed from the perspective of other logical processors. Advantageously, in the event of the transaction being successfully completed and committed, the first logical processor may have been able to dynamically perform the critical section without needing to acquire a lock, without the programming complexities generally associated with acquiring and managing locks, and without unnecessary cross-logical processor serialization.

Various different types of transactional execution or transactional memory are suitable for various different embodiments. Examples include, but are not limited to, purely hardware transactional memory (HTM), unbounded transactional memory (UTM), and hardware supported (e.g., accelerated) software transactional memory (STM) (hardware supported STM). In hardware transactional memory (HTM), one or more or all of the tracking of memory accesses, conflict resolution, abort tasks, and other transactional tasks may be performed predominantly or entirely in on-die hardware (e.g., circuitry) or other logic (e.g., any combination of hardware and firmware or other control signals stored in on-die non-volatile memory) of the processor. In unbounded transactional memory (UTM), both on-die processor logic and software may be used together to implement transactional memory. For example, UTM may use a substantially HTM approach to handle relatively smaller transactions while using substantially more software in combination with some hardware or other on-die processor logic to handle relatively larger transactions (e.g., unbounded sized transactions which may be too big for the on-die processor logic to handle by itself). In still embodiments, even when software is handling some portion of the transactional memory, hardware or other on-die processor logic may be used to assist, accelerate, or otherwise support the transactional memory through on-die processor logic supported STM.

In some embodiments, transactional execution may optionally support nested transactions, although this is not required. In one aspect, all nested transactions may be either performed or not performed as a set but not individually. Accordingly, in such embodiments, a set of two or more nested transactions may be attempted to be committed, and may be committed or aborted, only when a transaction end instruction (e.g., a transaction end plus commit to persistence instruction) is an outermost transaction end instruction and/or belongs to an outermost transaction of the set of nested transactions. By way of example, a nest count variable may optionally be used to keep track of the number of nested transactions (e.g., may be incremented on transaction begin instructions and decremented on transaction end instructions). In other embodiments only single non-nested transactions may optionally be supported without allowing nested transactions, and all transaction end instructions may attempt to commit and may either commit or abort all transactions when they are performed.

Figure 2:
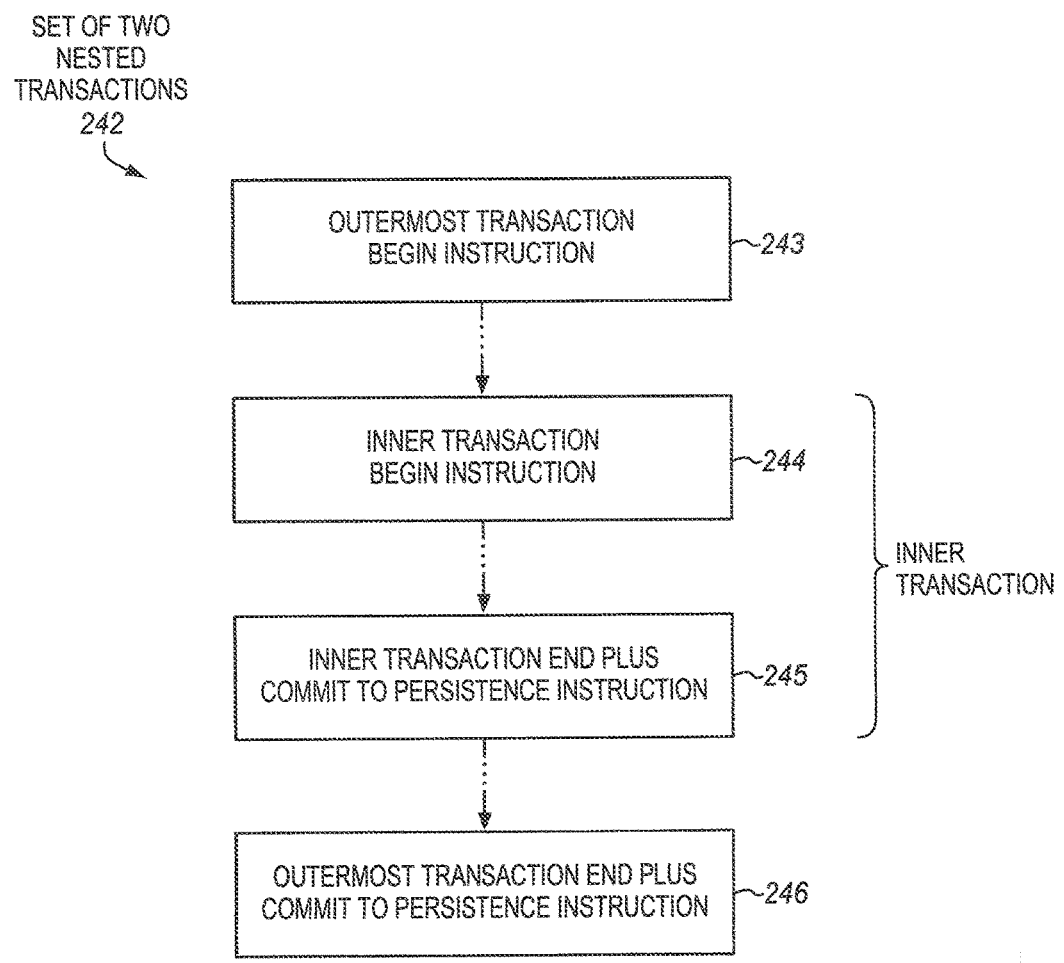
FIG. 2 is a block flow diagram of an example of a nested transaction that is suitable for some embodiments.

FIG. 2 is a block flow diagram of an example set of two nested transactions 242 which is suitable for some embodiments. The set includes an outermost transaction which includes at least an outermost transaction begin instruction 243 and an outermost transaction end plus commit to persistence instruction 246. An inner transaction includes at least an inner transaction begin instruction 244 and an inner transaction end plus commit to persistence instruction 245. In some embodiments, since the inner transaction end plus commit to persistence instruction 245 is not an outermost transaction end instruction for the set of nested transactions, it may not end the nested transactions, and may optionally not ensure that prior store to memory operations, being made to a persistent memory, and that have already been accepted to memory, have been stored persistently. Optionally avoiding making this guarantee may help to improve performance. Alternatively, in other embodiments, such an inner transaction end plus commit to persistence instruction 245 may not end the nested transactions, but may optionally ensure that prior store to memory operations, being made to a persistent memory, and that have already been accepted to memory, have been stored persistently. The outermost transaction end plus commit to persistence instruction 246 may end the nested transactions, and may ensure that prior store to memory operations, being made to a persistent memory, and that have already been accepted to memory, have been stored persistently.

Figure 3:
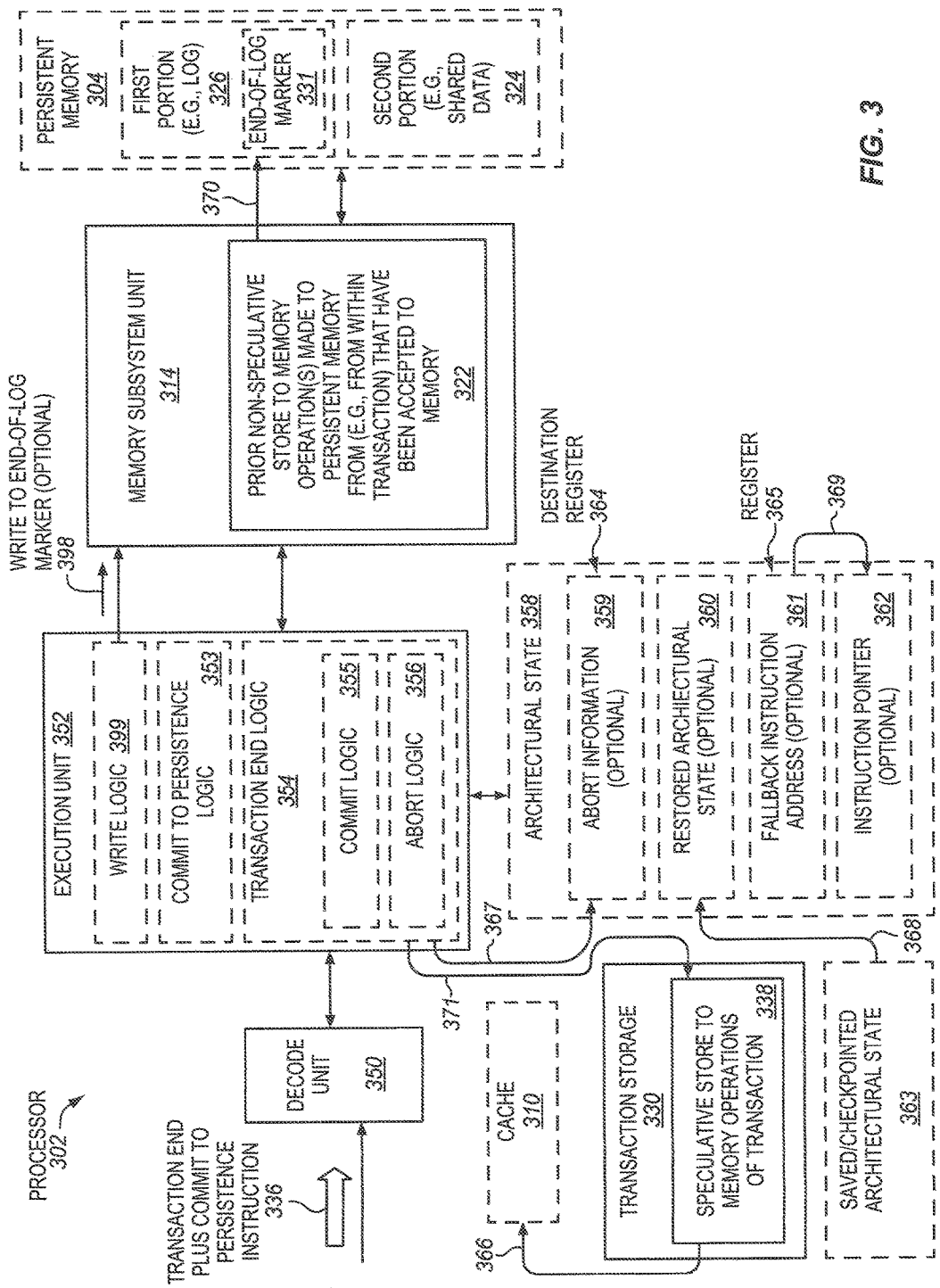
FIG. 3 is a block diagram of an embodiment of a processor that is operative to perform an embodiment of a transaction end plus commit to persistence instruction.

FIG. 3 is a block diagram of an embodiment of a processor 302 that is operative to perform an embodiment of a transaction end plus commit to persistence instruction 336. In some embodiments, the processor 302 may be included in the computer system 100 of FIG. 1. Alternatively, the processor 302 may be included in a similar or different computer system. Moreover, the computer system 100 may include similar or different processors than the processor 302.

In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, network processors, communications processors, cryptographic processors, graphics processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor 302 may receive the transaction end plus commit to persistence instruction 336. The transaction end plus commit to persistence instruction 336 may optionally have any of the characteristics as the previously described transaction end plus commit to persistence instruction 136 of FIG. 1. The instruction may be fetched with an instruction fetch unit or otherwise received from memory on a bus or other interconnect. The instruction may represent a macroinstruction, assembly language instruction, machine code instruction, or other instruction or control signal of an instruction set of the processor. In some embodiments, the transaction end plus commit to persistence instruction may explicitly specify (e.g., through one or more fields or a set of bits), or otherwise indicate (e.g., implicitly indicate), a destination storage location where a value is to be stored responsive to the instruction (e.g., to write an end-of-log marker 331), although it is not required that such a value be stored by the instruction in other embodiments.

The processor includes a decode unit or decoder 350. The decode unit may receive and decode the transaction end plus commit to persistence instruction 336. The decode unit may output one or more relatively lower-level instructions or control signals (e.g., one or more microinstructions, micro-operations, micro-code entry points, decoded instructions or control signals, etc.), which reflect, represent, and/or are derived from the relatively higher-level transaction end plus commit to persistence instruction. In some embodiments, the decode unit may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instruction(s) or control signal(s). The decode unit may be implemented using various different mechanisms including, but not limited to, microcode read only memories (ROMs), look-up tables, hardware implementations, programmable logic arrays (PLAs), and other mechanisms suitable to implement decode units. In some embodiments, instead of the transaction end plus commit to persistence instruction 336 being provided directly to the decode unit 350, an instruction emulator, translator, morpher, interpreter, or other instruction conversion module may optionally be used.

Referring again to FIG. 3, an on-die execution unit 352 is coupled with the decode unit 350, the memory subsystem unit 314, transaction storage 330, and architectural state 358. The memory subsystem unit 314 is coupled with the persistent memory 304. The memory subsystem unit 314, the persistent memory 304, and the transaction storage 330, may optionally have any of the characteristics as the previously described memory subsystem unit 114, persistent memory 104, and transaction storage 130, of FIG. 1. In the illustrated example, the execution unit for simplicity is shown as a single unit, although it is to be appreciated that the execution unit may include distributed logic (e.g., logic at the transaction storage related to committing or aborting a transaction, logic at the memory subsystem unit to monitor and signal when pending stores in the memory controllers have drained to and been received by persistent memory, etc.

The execution unit may receive the one or more decoded or otherwise converted instructions or control signals that represent and/or are derived from the transaction end plus commit to persistence instruction 336. The execution unit and/or the processor may include specific or particular logic (e.g., transistors, integrated circuitry, or other hardware potentially combined with firmware (e.g., instructions stored in non-volatile memory) and/or software) that is operative to perform the transaction end plus commit to persistence instruction. In some embodiments, the execution unit may optionally be operative in response to and/or as a result of the transaction end plus commit to persistence instruction 336 (e.g., in response to one or more instructions or control signals decoded from the transaction end plus commit to persistence instruction and/or in response to the instruction being decoded and/or in response to the instruction being provided to a decoder) to atomically store a value to a destination storage location specified or otherwise indicated by the instruction. In some embodiments, storing the value to the destination storage location may include writing an end-of-log marker 331. As shown, the execution unit may include write logic 399 to perform a write or store 398 of the value to the destination storage location. In other embodiments, it is not required that the instruction store this value to the destination storage location.

The execution unit may also be operative in response to and/or as a result of the transaction end plus commit to persistence instruction 336 to ensure or guarantee that certain prior store to memory operations, which were performed before commencing performing the transaction end plus commit to persistence instruction 336, and which are being made to the persistent memory 304, but which are not necessarily to have actually been stored persistently or durably when performance of the transaction end plus commit to persistence instruction commences, are to have been stored persistently or durably (e.g., in the persistent memory or an intermediate power backed buffer) before the transaction end plus commit to persistence instruction 336 commits (e.g., retires) and/or becomes globally visible. In various embodiments, the aforementioned certain store to memory operations, which the transaction end plus commit to persistence instruction is able to ensure have been committed to persistence, may have at least one of the following characteristics: (1) they have already been accepted to memory when the performance of the transaction end plus commit to persistence instruction commences; and/or (2) they have already passed through or been removed from a cache hierarchy of the processor on the way to the persistent memory when the performance of the transaction end plus commit to persistence instruction commences; and/or (3) they have already been stored in a memory controller when the performance of the transaction end plus commit to persistence instruction commences; and/or (4) they have bypassed a transaction storage used to store speculative operations of the transaction when the performance of the transaction end plus commit to persistence instruction commences and are not in the caches; and/or (5) they may be non-speculative or non-transactional instructions and are not in the caches when the performance of the transaction end plus commit to persistence instruction commences; and/or (6) they may be performed to the first portion 326 of the persistent memory and/or to a write-ahead log instead of outside of the first portion 326 and/or instead of to shared data and are not in the caches. By way of example, as shown in the illustrated embodiment, the execution unit 352 may be operative to ensure that prior store to memory operation(s) 322, which are being made to the persistent memory 304, and which have been accepted to memory, and which are stored in the memory subsystem unit 314 (e.g., write pending buffers of one or more memory controllers), are stored to the persistent memory 304 as shown at arrow 370 (e.g., optionally to the first portion 326 which is optionally used to implement a log) before the transaction end plus commit to persistence instruction 336 commits and/or is globally visible.

As used herein, the prior store to memory operations made to the persistent memory, which are to have been performed before the transaction end plus commit to persistence instruction, may broadly considered to be "accepted to memory" when they have advanced passed the cache(s) (e.g. have passed through or have bypassed the cache(s)) on their way to memory. As one example, such stores may be accepted to memory when they have been received into buffers or queues in the memory subsystem unit 314 and/or write pending buffers of one or more memory controllers thereof. As another example, such stores may be accepted to memory when they are non-temporal stores to write-back (WB) memory that have become globally visible. As another example, such stores may be accepted to memory when they are stores to uncacheable (UC), write-combining (WC), or write-through (WT) memory and have become globally visible. As yet another example, such stores may be accepted to memory when they are temporal stores to write-back (WB) memory that have become globally visible, and after either cache line flushes or cache line write backs, have been performed for the same cache lines as the temporal stores to the write-back (WB) memory.

As shown, in some embodiments, the execution unit 352 may optionally have commit to persistence logic 353 that is operative to help assist with making this guarantee. This guarantee may be made in various different ways in different embodiments. For example, in some embodiments, the execution unit and/or the commit to persistence logic may be operative to perform a handshake or other communication with the memory subsystem unit in conjunction with making this guarantee. By way of example, the execution unit and/or the commit to persistence logic may not allow the transaction end plus commit to persistence instruction to retire, until the memory subsystem unit has signaled that all stores that it had received at the time performance of the transaction end plus commit to persistence instruction started, have been drained from or otherwise left the memory subsystem unit, and have been received by the persistent memory (or in an optional intermediate power failure backed buffer if one is implemented).

In practice, this guarantee may mainly be meaningful for a given software thread that is performing the transaction end plus commit to persistence instruction 336, not so much to other software threads. These other software threads may have associated store operations that have also been accepted to memory, and that are also committed to persistence by the persistent commit sub-operation. The guarantee made by the persistent commit sub-operation often may not distinguish between the store to memory operations of the given software thread versus those of the other software threads. However, only the given software thread performing the transaction end plus commit to persistence instruction may have taken the appropriate cache flush, cache write back, and/or other appropriate actions to prepare for the transaction end plus commit to persistence instruction in order for the guarantee to be meaningful. The given software thread may take such actions to prepare for the transaction end plus commit to persistence instruction to allow its operation to meaningfully make the guarantee, but the other threads may not necessarily care and accordingly the operation of the transaction end plus commit to persistence instruction may not be meaningful for these other software threads in the event that they do not.

In some embodiments, the execution unit 352, in response to the transaction end plus commit to persistence instruction 336, may also be operative to atomically with the other performed operations end a corresponding transaction in which it is included (e.g., the transaction 132). To end the transaction it may either: (1) commit the transaction (e.g., commit speculative state updates of the transaction atomically before the transaction end plus commit to persistence instruction commits (e.g., retires) or becomes globally visible); or (2) abort the transaction (e.g., abort the speculative state updates of the transaction atomically, if an attempt to commit the speculative state updates of the transaction fails, before the transaction end plus commit to persistence instruction commits or becomes globally visible). In some embodiments, the transaction may be aborted after having begun the transaction end plus commit to persistence instruction if an abort event is detected before a certain point (e.g., before a store operation of the instruction has stored a value to a destination location, which may be used to persistently store an end-of-log marker), but otherwise may complete if the abort event is not detected until after the certain point. As shown, the execution unit may optionally have transaction end logic 354 to end the transaction, commit logic 355 provides signals or control to attempt to commit and where possible commit the transaction, and abort logic 356 to abort the transaction. For example, as shown, the execution unit and/or the transaction end logic may either commit or abort one or more store to speculative memory operations 338 that have been stored in a transaction storage 330.

The execution unit 352 and/or the commit logic 355, responsive to the instruction 336, may be operative to commit the transaction in different ways in different embodiments. As shown at arrow 366, in some embodiments, the execution unit and/or the commit logic may commit the store to memory operations of the transaction to a cache 310. For example, in some embodiments, the transaction storage 330 may be implemented in the cache (e.g., similar to shown in transaction storage 130 and cache 110 of FIG. 1), and in order to commit the transaction one or more bits associated with each cache line that is modified by the store to memory operations 338 may be modified to indicate a change in the status of the cache line from speculative to non-speculative. The then non-speculative cache lines may then gradually be written back to memory (e.g., to the second portion 324 of the persistent memory, which may optionally be used to store the shared data), for example based on a cache line eviction algorithm. As another example, in some embodiments, the transaction storage 330 may optionally be implemented outside of the cache(s), and in order to commit the transaction, the (e.g., now non-speculative) store to memory operations 338 may be stored from the transaction storage to the cache(s). Alternatively, in other embodiments, the execution unit and/or the commit logic may optionally commit the store to memory operations 338 from the transaction storage to the memory subsystem unit 314. For example, if the transaction storage is implemented in a cache, the cache lines may be marked non-speculative (e.g., as described above) and soon thereafter (e.g., within a few clock cycles) the then non-speculative cache lines may be evicted from the cache(s) into the memory subsystem unit 314. As another example, at the point when they are committed, the store to memory operations 338 of the transaction storage may optionally be performed non-temporally so that they either bypass the cache(s), or are stored in the caches and immediately evicted, or leave a copy in the caches that is also forwarded beyond the caches. As yet another example, the store to memory operations 338 of the transaction storage 330 may be applied or performed directly to the memory subsystem unit 314 completely bypassing the cache(s). In some embodiments, the instruction may be operative to cause the processor to commit the store to memory operations 338 of the transaction atomically with the persistent storage of the prior store to memory operations 322.

In some embodiments, the second portion 324 of the persistent memory may be used to store the shared data, and the store to memory operations 338 of the transaction may be made directly to the shared data while it is resident in the persistent memory, although this is not required. One potential advantage of making such memory state updates to the shared data in-place in the persistent memory is that it may help to avoid needing to buffer or escrow the modifications of the shared data (i.e., aside from that done in the transaction storage while the store operations are still speculative) as would otherwise often need to be done if the updates were instead initially made to shared data in non-persistent memory (e.g., RAM used for main memory) and then the updates were propagated to the persistent memory (e.g., a hard disk or other ROM used for backing storage).

The execution unit 352 and/or the abort logic 356, responsive to the instruction 336, may be operative to abort the transaction if an attempt to commit the transaction fails. In some embodiments, this may include discarding the store to memory operation(s) 338 of the transaction so that they are never visible to other logical processors. As shown at arrow 371, the execution unit and/or the abort logic may signal the transaction storage to discard the store to memory operation(s) 338. As one example, this may include modifying one or more bits in one or more corresponding cache lines to indicate that the cache lines are invalid. For example, this may include modifying an invalid bit of a MESI or MOSI coherency protocol cache line. Alternatively, if the transaction buffer is implemented outside of the cache lines, this may include simply discarding the store operations without performing or applying them.

As shown at arrow 368, in some embodiments, in the case of an abort, the execution unit 352 and/or the abort logic 356, responsive to the instruction 336, may optionally be operative to restore checkpointed or otherwise saved architectural state 363 to architectural state 358 of the processor as restored checkpointed architectural state 360. In one aspect, the saved and restored architectural state may include the current state of various architectural registers, such as, for example, general-purpose registers, packed data registers, status registers, flags registers, and control registers, as well as various other types of architectural state, at the time when transactional execution was first entered.

In some embodiments, in the case of an abort, the execution unit 352 and/or the abort logic 356, responsive to the instruction 336, may optionally be operative to store abort information 359 in a destination storage location. In some embodiments, the transaction end plus commit to persistence instruction may explicitly specify (e.g., through one or more fields or a set of bits) or otherwise indicate (e.g., implicitly or inherently indicate without explicitly specifying) a destination register (e.g., a destination general-purpose register) or other storage location where the abort information is to be stored in the event of a transaction abort. As shown by arrow 367, the abort information 359 may optionally be stored in destination register 364 of the architectural state. Various different types of abort information are suitable. For example, in some embodiments, the abort information may indicate a reason why the abort occurred, such as, for example, if the abort was due to detection of a data conflict, due to execution of a transactional execution abort instruction, due to insufficient transactional resources to complete the transaction, due to a debug, breakpoint, or other exception, or the like. As another example, in some embodiments, the abort information may indicate whether it is estimated or expected that the transaction may succeed if retried. As yet another example, in some embodiments, the abort information may indicate whether or not the abort occurred during a nested transaction. Other abort information is also suitable as well as any subset or combination of such abort information.

As shown at arrow 369, in some embodiments, the execution unit 352 and/or the abort logic, responsive to the instruction 336, may optionally be operative to store a fallback instruction address 361 to an instruction pointer 362. This may allow execution to resume at the fallback instruction address following the abort. As shown in the illustration, in some embodiments, the fallback address may optionally initially have been stored in an architectural register 365. Alternatively, memory locations or other storage locations may optionally be used to store the fallback address. By way of example, the fallback address may have been indicated by a previous transaction begin instruction (e.g., an XBEGIN instruction), and stored in the register 365 or other storage location in response to performance of the previous transaction begin instruction (e.g., the initial transaction begin instruction of a single non-nested transaction or set of nested transactions which initially started the transactional execution). In some embodiments, only single non-nested transactions may optionally be supported, whereas in other embodiments nested transactions may optionally be supported.

In some embodiments, the processor may treat nested transactions as one monolithic transaction. For example, the nested transactions may either all be committed or aborted but not separately. By way of example, the processor may attempt to commit the nested transactions only when an outermost transaction end plus commit to persistence instruction is performed (e.g., a nesting count incremented for each transaction begin instruction and decremented for each transaction end instruction becomes zero). In one aspect, in the case of an abort of a nested transaction, processing may resume at the fallback instruction/address indicated by the first/outermost transaction begin instruction that that initially started transactional execution for the nested transaction.

Although certainly not limited to being used in conjunction with write-ahead logging, one possible use of the transaction end plus commit to persistence instruction 336 is in conjunction with the prior store to memory operations 322 of a transaction being performed to modify a log in the first portion 326 of the persistent memory, and the store to memory operations 338 of the transaction being performed to modify shared data in the second portion 324 of the persistent memory. The transaction end plus commit to persistence instruction when performed may be operative to ensure that the modifications to the write-ahead log that have been accepted to memory are stored persistently before any speculative transactional changes due to the transaction are allowed to be made to the shared data in the persistent memory. Transactional execution may confine the modifications to the shared data (e.g., in the transaction storage 330) until the corresponding modifications to the log have been persistently committed. The optional store of the value to the end-of-log marker 331 may be used to indicate that the transaction has been recorded persistently in the log. Advantageously, this guarantee may help to allow software to ensure that, in the event of a power failure, system crash or the like, the shared data is not irreversibly corrupted and/or lost, but rather the log may be used to recover to a stable point. However, the transaction end plus commit to persistence instructions disclosed herein are general-purpose instructions that may also optionally be used for various other purposes besides write-ahead logging subject to the vast creativity of programmers. For example, they may be useful in other applications or environments where it is desired to have certain store to memory operations bypass transactional execution and be stored persistently (e.g., data known not to be shared, more time critical data, etc.) before other store to memory operations which do not bypass the transactional execution (e.g., data that is likely or possibly shared, less time critical data, etc.).

There are several possibilities with regard to the end of log marker. A first possibility is that the end-of-log marker was not written to persistent storage. This may mean that software did not reach the transaction end plus commit to persistence instruction. In such a case, the transactional memory transaction did not make any changes to visible state other than an incomplete log record to clean up for example with an exception handler. A second possibility is that the end-of-log marker was not written to persistent storage because the transaction self-aborted. This may be treated the same as the first possibility by recovery code. A third possibility is that the write to the end-of-log marker was performed but before it could complete and be stored persistently the transaction end plus commit to persistence instruction was interrupted by a power failure or the like before the end-of-log marker was actually stored persistently. The recovery code in this case may treat it as incomplete transaction and discard the speculative changes. The visible system state is correct since no concurrent thread noticed the successful completion of the transaction due to the power failure. A fourth possibility is that the write to the end-of-log marker was performed and was stored persistently, but the transaction end plus commit to persistence instruction was interrupted before it was complete by a power failure or the like. In this case transaction may be treated as having taken effect by the recovery code. For example, the redo log may be replayed to restore data.

To avoid obscuring the description, a relatively simple processor 302 has been shown and described. However, the processor may optionally include other processor components. For example, various different embodiments may include various different combinations and configurations of the components shown and described for any of FIGS. 8A-B, 9A-B, and 10. By way of example, considering FIG. 8B, the instruction fetch unit 838 may fetch the instruction, the decode unit 840 may decode the instruction, the scheduler unit 856 may schedule the associated operations, the retirement unit 854 may retire the instruction, etc. All of the components of the processor may be coupled together to allow them to operate as intended.

Figure 4:
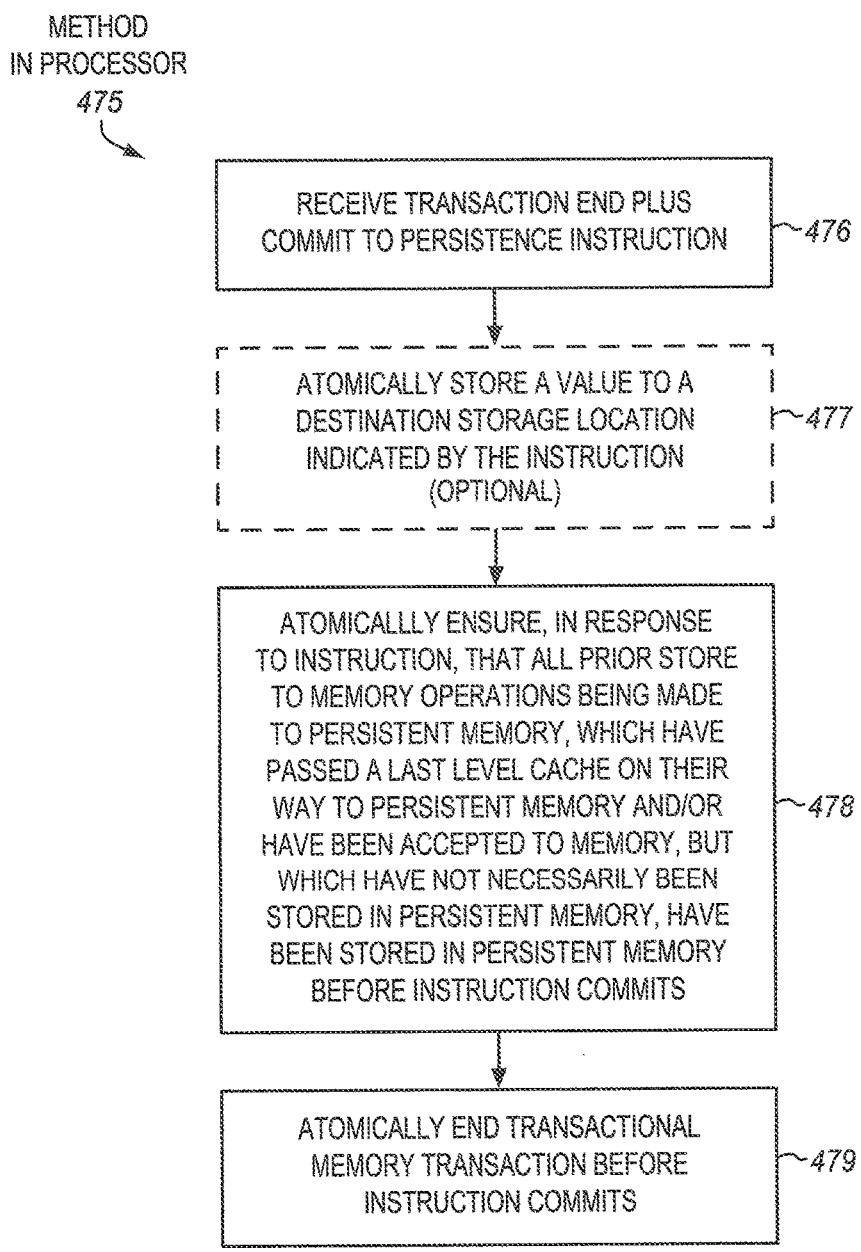
FIG. 4 is a block flow diagram of an embodiment of a method of performing an embodiment of a transaction end plus commit to persistence instruction.

FIG. 4 is a block flow diagram of an embodiment of a method 475 of performing an embodiment of a transaction end plus commit to persistence instruction. In various embodiments, the method may be performed by a processor, instruction processing apparatus, or other digital logic device. In some embodiments, the method of FIG. 4 may be performed by and/or within the processor of FIG. 3. The components, features, and specific optional details described herein for the processor of FIG. 3, also optionally apply to the method of FIG. 4. Alternatively, the method of FIG. 4 may be performed by and/or within a similar or different processor or apparatus. Moreover, the processor of FIG. 3 may perform methods the same as, similar to, or different than those of FIG. 4.

The method includes receiving the transaction end plus commit to persistence instruction, at block 476. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.).

In some embodiments, the method optionally includes atomically with the other operations storing a value to a destination storage location that is specified or otherwise indicated by the instruction, at block 477. In some embodiments, the store of the value to the destination storage location may optionally be used to write an end-of-log marker, which may be indicated as the destination storage location by the instruction, in a write ahead log. However, as will be discussed further below, storing the value to the destination storage location within the performance of the transaction end plus commit to persistence instruction is optional not required (e.g., a separate store instruction may optionally be used to write the end-of-log marker, the instruction may be used for a purpose other than redo and/or undo logging, etc.).

The method includes atomically ensuring, in response to the transaction end plus commit to persistence instruction, that all prior store to memory operations (i.e., which have been performed before beginning performance of the transaction end plus commit to persistence instruction), which are being made to a persistent memory, and which have passed (e.g., passed through or bypassed) a last level cache on their way to persistent memory and/or been accepted to memory when performance of the instruction begins, but which have not necessarily been stored in the persistent memory when performance of the transaction end plus commit to persistence instruction begins, have been stored in the persistent memory before the transaction end plus commit to persistence instruction commits (e.g., retires) or otherwise becomes globally visible, at block 478. Ensuring that the prior store to memory operations have been stored in the persistent memory encompasses these store to memory operations being stored in an intermediate power failure protected buffer, if one is optionally implemented.

The method includes atomically ending a transaction, in response to the transaction end plus commit to persistence instruction, at block 479. This may include either committing speculative state updates of the transaction atomically, before the transaction end plus commit to persistence instruction commits (e.g., retires) or otherwise becomes globally visible, or aborting the speculative state updates of the transaction (e.g., if an abort condition is detected or an attempt to commit the speculative state updates of the transaction fails before an end-of-log marker is written).

The flow diagram shows a particular order of operations according to embodiments, although this order is exemplary. Alternate embodiments may perform the operations in different order, combine certain operations, overlap certain operations, etc. In addition, the method has been described in a relatively basic form, but operations may optionally be added to and/or removed from the method. For example, in other embodiments, the method may optionally include one or more microarchitectural operations to implement the instruction. By way of example, the instruction may be fetched, decoded, scheduled out-of-order, an execution unit may perform microarchitectural operations to implement the instruction (e.g., any of the various operations described above in conjunction with FIG. 3), the instruction may be retired, etc.

As previously described, in some embodiments, a processor may allow (e.g., have architectural support or extensions to allow) certain store to memory operations that are made within a given transaction be performed non-speculatively and non-transactionally. For example, such store to memory operations may not be retained in a transaction buffer until the transaction commits or aborts, but rather may proceed to be visible, and potentially accepted to memory, and potentially may proceed all the way to persistent memory, before the transaction commits, and irrespective of whether the transaction commits or aborts. The processor may also allow other store to memory operations that are made within the same given transaction to be performed speculatively and transactionally. For example, these other store to memory operations may be retained in the transaction buffer until the transaction commits or aborts, and may only be allowed to proceed to the persistent memory if the transaction actually commits and atomically. Transactional execution logic of the processor may autonomously prevent these stores from being performed to a point that they are visible until the transaction is actually committed.

Different types of architectural support are contemplated to allow a processor to allow certain stores made within a transaction to bypass transactional execution. To further illustrate certain concepts, several different example embodiments will be described.

Figure 5:
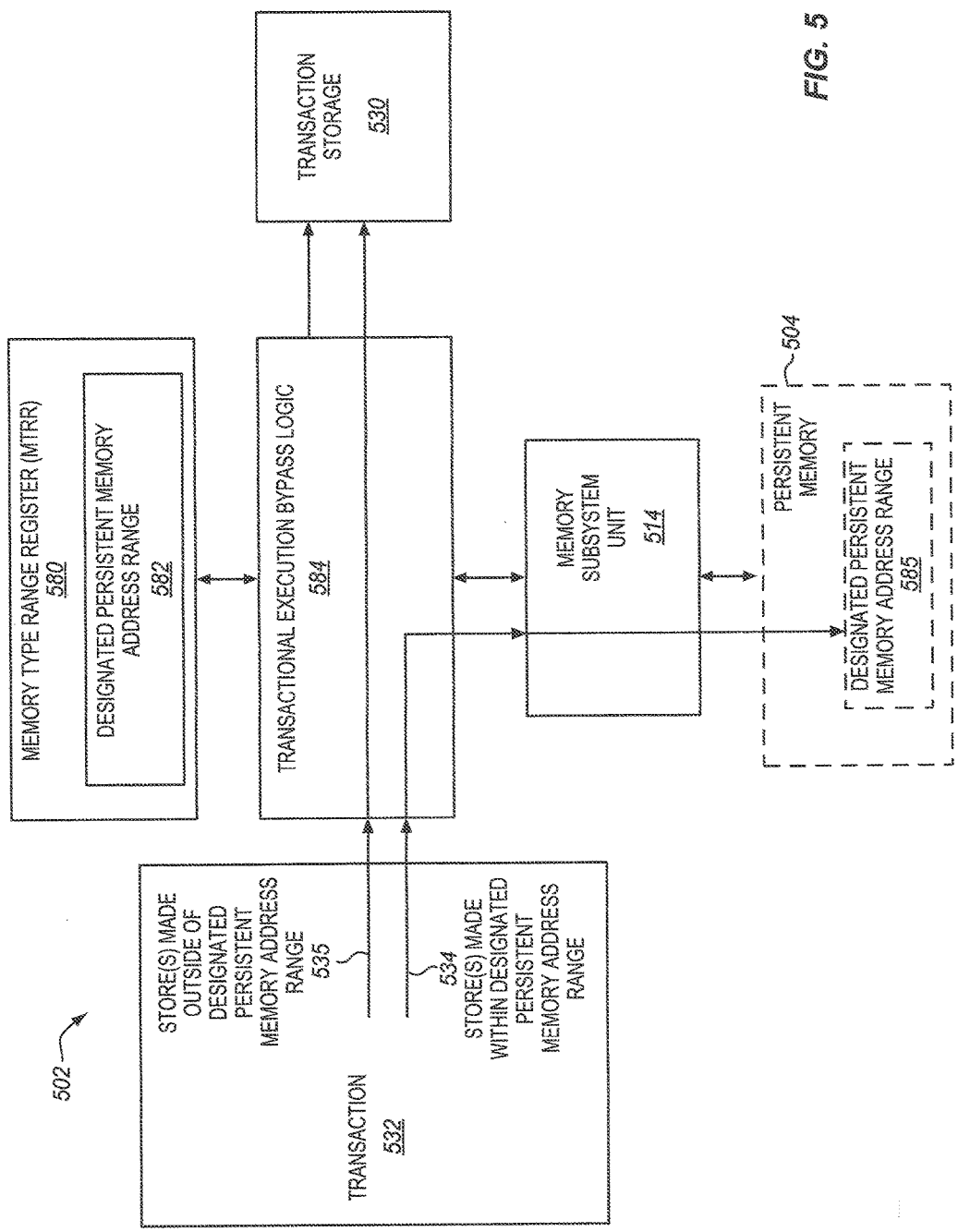
FIG. 5 is a block diagram illustrating a first suitable approach to allow certain stores made within a transaction to be performed non-speculatively and bypass transactional execution.

FIG. 5 is a block diagram of an example embodiment of a processor 502 coupled with a persistent memory 504 that illustrates a first approach to allow certain stores 534 being made within a transaction 532 to bypass transactional execution. The processor includes a memory type range register (MTRR) 580, transactional execution bypass logic 584, a transaction storage 530, and a memory subsystem unit 514. The transactional execution bypass logic is coupled with the MTRR, the transaction storage, and the memory subsystem unit. The MTRR may store a designated persistent memory address range 582.

The processor may perform the transaction 532 with transactional execution. The transaction includes both stores 535 made outside of the designated persistent memory address range 582 indicated in the MTRR, as well as stores 534 made within the designated persistent memory address range indicated in the MTRR. Both of these types of stores may be handled by the transactional execution bypass logic. The transactional execution bypass logic may examine each received store to see whether it is being made to within or outside of the designated persistent memory address range indicated in the MTRR. If the store is being made outside of the designated persistent memory address range indicated in the MTRR, then the transactional execution bypass logic may not allow the store to bypass transactional execution. Rather, the store may be performed transactionally and speculatively, and may be directed to the transaction storage 530.

Conversely, if the store is being made within the designated persistent memory address range indicated in the MTRR, then the transactional execution bypass logic may allow the store to bypass transactional execution. The store may be allowed to be performed non-transactionally and non-speculatively, and may be directed to the memory subsystem unit 514 bypassing the transaction storage 530. As shown, the memory subsystem unit may allow the store to proceed to the designated persistent memory address range 585 in the persistent memory 504. Such stores may be allowed to drain or leak out of the memory subsystem unit to the persistent storage. An embodiment of a transaction end plus commit to persistence instruction as disclosed elsewhere herein may be used to ensure that such stores are committed to persistence. Representatively, this designated persistent memory address range may optionally be used to store a write-ahead log.

In the illustrated embodiment, a single MTRR and single designated persistent memory address range has been shown and described, although two or more MTRR may be used to store two or more designated persistent memory address ranges. Moreover, the use of MTRRs is not required, but rather the designated persistent memory address ranges may optionally be stored in other registers or storage locations. In the illustrated embodiment, the MTRR is used to store a range for which stores made thereto are allowed to bypass transactional execution, although in another embodiment the MTRR may be used to store a range for which stores made thereto are not allowed to bypass transactional execution.

Figure 6:
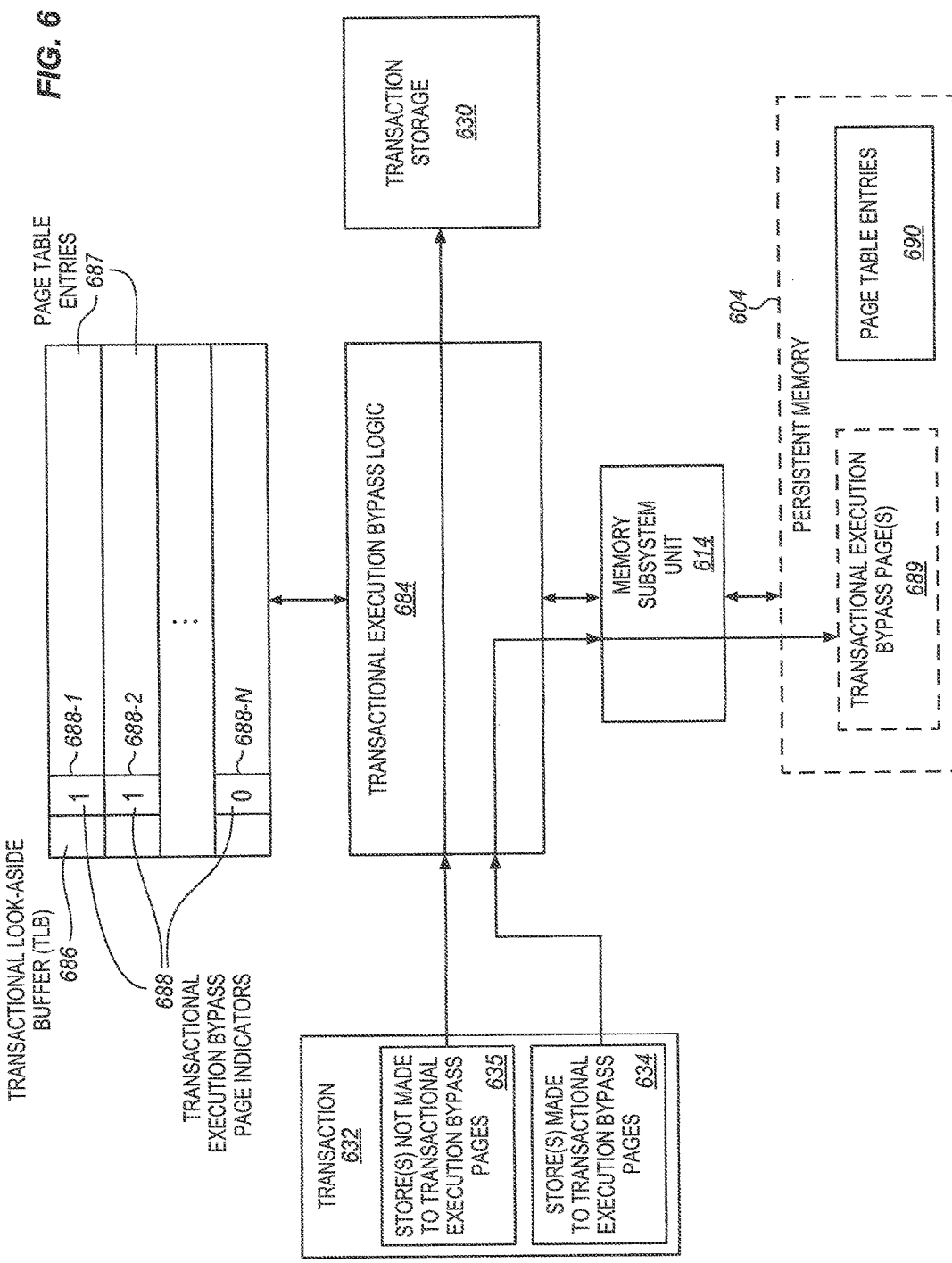
FIG. 6 is a block diagram illustrating a second suitable approach to allow certain stores made within a transaction to be performed non-speculatively and bypass transactional execution.

FIG. 6 is a block diagram of an example embodiment of a processor 602 coupled with a persistent memory 604 that illustrates a second approach to allow certain stores being made within a transaction 632 to bypass transactional execution. The processor includes a translation lookaside buffer (TLB) 686, transactional execution bypass logic 684, a transaction storage 630, and a memory subsystem unit 614. The transactional execution bypass logic is coupled with the TLB, the transaction storage, and the memory subsystem unit.

The TLB may store a number of page table entries 687. Each of the page table entries (PTEs) may have one or more bits which represent a transactional execution bypass page indicator 688. As shown, a first PTE may have a first indicator 688-1, a second PTE may have a second indicator 688-2, and a third PTE may have a third indicator 688-N. Each transactional execution bypass page indicator may indicate whether or not a corresponding page (e.g., with a physically address stored in the page table entry) is a transactional execution bypass page. According to one possible convention used in the illustration, a single bit may have a value of binary one to indicate that the corresponding page is a transactional execution bypass page, or may have a value of binary zero to indicate that the corresponding page is not a transactional execution bypass page. The opposite convention is also possible.

The processor may perform the transaction 632 with transactional execution. The transaction includes both stores 635 that are not made to transactional execution bypass pages, as well as stores 634 that are made to transactional execution bypass pages. Both of these types of stores may be handled by the transactional execution bypass logic. The transactional execution bypass logic may examine each received store to see whether or not it is being made to a transactional execution bypass page. If the store is not being made to a transactional execution bypass page, then the transactional execution bypass logic may not allow the store to bypass transactional execution. Rather, the store may be performed transactionally and speculatively, and may be directed to the transaction storage 630.

Conversely, if the store is being made to a transactional execution bypass page, then the transactional execution bypass logic may allow the store to bypass transactional execution. The store may be performed non-transactionally and non-speculatively, and may be directed to the memory subsystem unit 614, bypassing the transaction storage 630. As shown, the memory subsystem unit may allow the store to proceed to a set of one or more transactional execution bypass pages 689 in the persistent memory 604. As also shown, the persistent memory, or alternatively another type of memory, may store page table entries 690 that correspond to the page table entries 687 cached in the TLB.

In FIGS. 5-6 illustrate example microarchitectural structures of the processor (e.g., either the MTRR or the TLB) are operative to designate a portion of persistent memory to which stores are allowed to bypass transactional execution. In still other embodiments, instead of such portions of persistent memory needing to be specified in these or other microarchitectural structures, a fixed or implicit address range of persistent memory, fixed or implicit set of one or more pages of persistent memory, or other fixed or implicit portion of persistent memory may optionally be used to allow stores to bypass transactional execution.

Figure 7:
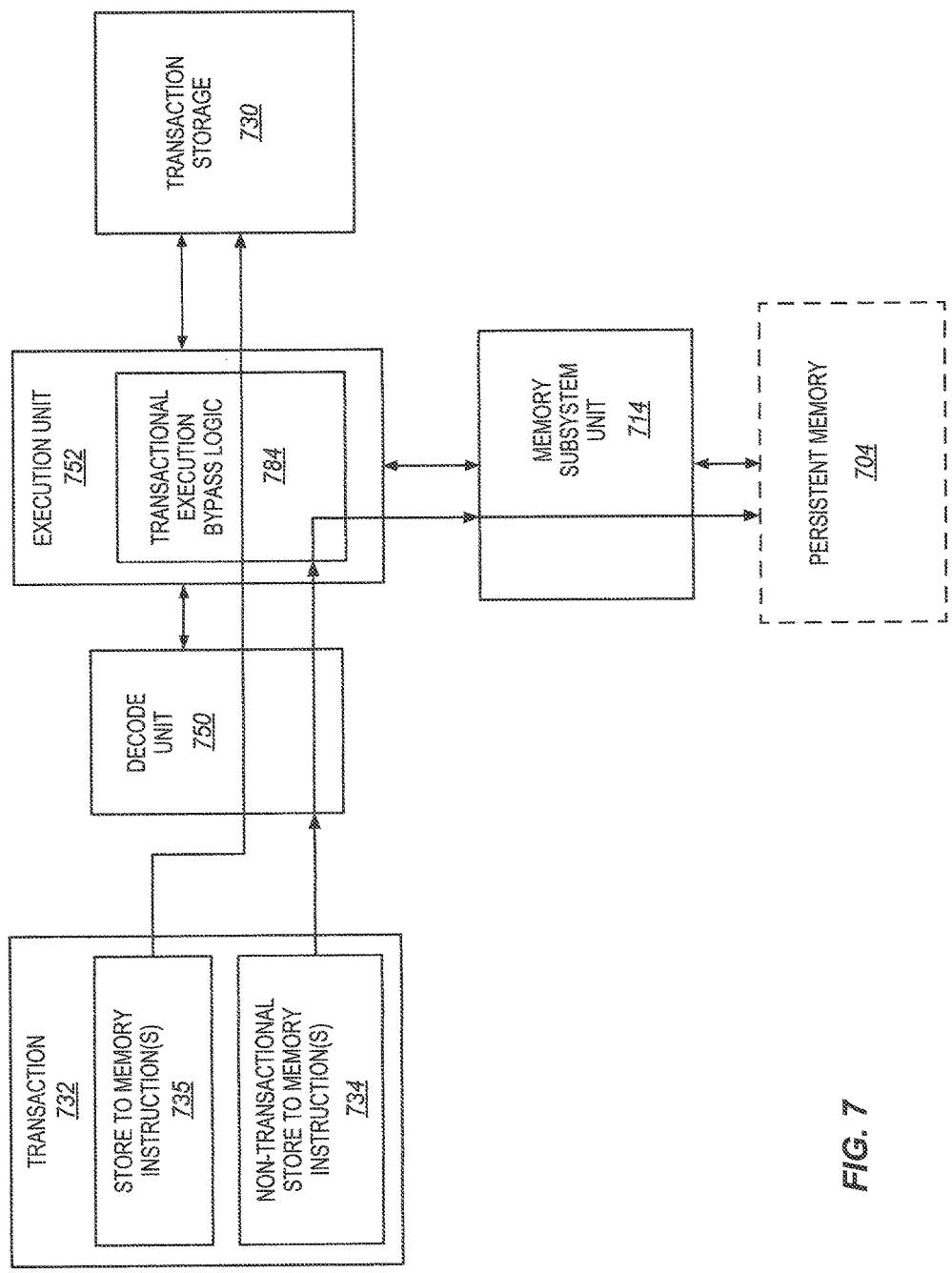
FIG. 7 is a block diagram illustrating a third suitable approach to allow certain stores made within a transaction to be performed non-speculatively and bypass transactional execution.

FIG. 7 is a block diagram of an example embodiment of a processor 702 coupled with a persistent memory 704 that illustrates a third approach to allow certain stores being made within a transaction 732 to bypass transactional execution. The processor includes a decode unit 750, an execution unit 752, transactional execution bypass logic 784, a transaction storage 730, and a memory subsystem unit 714. The execution unit and the transactional execution bypass logic are coupled with the decode unit, the transaction storage, and the memory subsystem unit. In the illustration, the transactional execution bypass logic is shown as being part of the execution unit, although in another embodiment the may be separate but coupled together.

The processor may perform the transaction 732 with transactional execution. The transaction includes both one or more store to memory instructions 735, and one or more non-transactional store to memory instructions 734. When performed within the transaction, the store to memory instruction(s) 735 are operative to cause the processor to handle the corresponding store operations so that they do not bypass transactional execution. In contrast, when performed within the transaction, the non-transactional store to memory instruction(s) 734 are operative to cause the processor to handle the corresponding store operations so that they bypass transactional execution.

Both the store to memory instruction(s) and the non-transactional store to memory instruction(s) may be provided to the decode unit. The decode unit may decode these instructions as described elsewhere herein into corresponding control signal(s) which may be provided to the execution unit and the transactional execution bypass logic. In some embodiments, the instruction(s) 734 may optionally have different opcodes than the instruction(s) 735. For example, the opcode of the non-transactional store to memory instruction(s) may implicitly or inherently fix that the store operations are to bypass transactional execution. Bypassing transactional execution for these instructions may be responsive to the decode unit decoding the opcodes. In other embodiments, the instruction(s) 734 may optionally have the same opcodes as the instruction(s) 735, but the non-transactional store to memory instruction(s) 734 may have a prefix, field of one or more bits, other set of one or more bits, or other "hint" to the processor to indicate that the store operations are to bypass transactional execution.

The transactional execution bypass logic, in response to the store to memory instruction(s) 784 (e.g., in response to them being decoded), may be operative to cause the corresponding store operations not to bypass transactional execution, and may be operative to direct these store operations to the transaction storage 730. Conversely, the transactional execution bypass logic, in response to the non-transactional store to memory instruction(s) 734 (e.g., in response to them being decoded), may be operative to cause the corresponding store operations to bypass transactional execution, and may be operative to direct these store operations to the memory subsystem unit 714, bypassing the transaction storage 730. As shown, the memory subsystem unit may allow the store operations to proceed to the persistent memory 704.

It is to be appreciated that the transactions, transaction storage, persistent memory, and memory subsystem units of FIGS. 5-7 may optionally have characteristics as described elsewhere herein. These are just a few illustrative example approaches. Other approaches are also contemplated and will be apparent to those skilled in the art and having the benefit of the present disclosure. For example, yet another approach would be to allow an entire thread local storage as orchestrated by an operating system, for example, and which may be described by a single register, to be used for this purpose.

In one usage model, stores that bypass transactional execution may be used to write to a write-ahead log (e.g., the log 128), whereas stores that do not bypass transactional execution may be used to write to shared data (e.g., the shared data 120). Then, in some embodiments, a transaction end plus commit to persistence instruction (e.g., instruction 136 or instruction 336) may be used to ensure the prior non-transactionally executed stores have been committed to persistence and to end the transaction and attempt to commit the transactionally executed stores. However, the scope of the invention is not limited to just this usage model or to use in conjunction with write-ahead logging. Rather, this may optionally be used for various other purposes subject to the creativity of the programmer (e.g., where some instructions in a transaction write data that is known not to be shared, whereas others write data that is shared).

As previously discussed, it is not required that a transaction end plus commit to persistence instruction store a value to a destination storage location. While this may be useful in some embodiments to write an end-of-log marker for write-ahead logging, the transaction end plus commit to persistence instruction may optionally be used for purposes other than write-ahead logging. For example, the transaction end plus commit to persistence instruction may optionally be used more generally in other applications or environments where it is desired to have certain store to memory operations bypass transactional execution and be stored persistently before other store to memory operations which do not bypass the transactional execution.

Further, even if the transaction end plus commit to persistence instruction is used for write-ahead logging, a separate store instruction may optionally be used to store a value to a destination storage location (e.g., to write the end-of-log marker). In some embodiments, this separate store instruction may be performed speculatively, without bypassing transactional execution, such that the store operation is not actually performed until the instruction is committed. This may be accomplished in different ways in different embodiments. As one example, the end-of-transaction marker may be located outside of a portion of non-speculative persistent memory (e.g., not in the designated persistent memory address range 585, or not in the transactional execution bypass page(s) 689). As another example, even if the end-of-transaction marker is located in a portion of non-speculative persistent memory, the store instruction may have an attribute (e.g., a different opcode or a speculative/non-speculative bit) that causes it to be performed speculatively not bypassing transactional execution. As yet another example, the store instruction may be the store to memory instruction 735 instead of the non-transactional store to memory instruction 734. In such embodiments, transactional execution may help to keep the end-of-transaction marker from being modified by the store instruction until the transactional memory transaction is committed.

In some embodiments, an instruction set of a processor may include a transaction end plus commit to persistence plus flush instruction. This instruction may have transaction end and commit to persistence characteristics as described elsewhere herein, may additionally have a flush operation, and may omit an operation to store a value to a destination memory location (e.g., omit writing an end-of-transaction marker). Rather, the aforementioned separate store instruction may store this value to the destination memory location (e.g., write an end-of-transaction marker). The transaction end plus commit to persistence plus flush instruction may explicitly specify or otherwise indicate the same memory location as the separate store instruction. The flush operation may flush or force the store of the value to the memory location out of the transactional memory transaction and/or caches. This may be performed atomically with the other operations being performed by the instruction. This may allow the store of the value to the memory location to escape the prison or quarantine of transactional memory. In some embodiments, rather than the transaction end plus commit to persistence plus flush instruction needing to specify the same memory location as the preceding separate store instruction, the memory location may optionally be an implicit variable that is configured by an additional separate instruction or be configured in a model specific register or other special register.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 800 includes a fetch stage 802, a length decode stage 804, a decode stage 806, an allocation stage 808, a renaming stage 810, a scheduling (also known as a dispatch or issue) stage 812, a register read/memory read stage 814, an execute stage 816, a write back/memory write stage 818, an exception handling stage 822, and a commit stage 824.

FIG. 8B shows processor core 890 including a front end unit 830 coupled to an execution engine unit 850, and both are coupled to a memory unit 870. The core 890 may be a reduced instruction set computing (RISC) core, a complex instruction set computing (CISC) core, a very long instruction word (VLIW) core, or a hybrid or alternative core type. As yet another option, the core 890 may be a special-purpose core, such as, for example, a network or communication core, compression engine, coprocessor core, general purpose computing graphics processing unit (GPGPU) core, graphics core, or the like.

The front end unit 830 includes a branch prediction unit 832 coupled to an instruction cache unit 834, which is coupled to an instruction translation lookaside buffer (TLB) 836, which is coupled to an instruction fetch unit 838, which is coupled to a decode unit 840. The decode unit 840 (or decoder) may decode instructions, and generate as an output one or more micro-operations, micro-code entry points, microinstructions, other instructions, or other control signals, which are decoded from, or which otherwise reflect, or are derived from, the original instructions. The decode unit 840 may be implemented using various different mechanisms. Examples of suitable mechanisms include, but are not limited to, look-up tables, hardware implementations, programmable logic arrays (PLAs), microcode read only memories (ROMs), etc. In one embodiment, the core 890 includes a microcode ROM or other medium that stores microcode for certain macroinstructions (e.g., in decode unit 840 or otherwise within the front end unit 830). The decode unit 840 is coupled to a rename/allocator unit 852 in the execution engine unit 850.

The execution engine unit 850 includes the rename/allocator unit 852 coupled to a retirement unit 854 and a set of one or more scheduler unit(s) 856. The scheduler unit(s) 856 represents any number of different schedulers, including reservations stations, central instruction window, etc. The scheduler unit(s) 856 is coupled to the physical register file unit(s) 858. Each of the physical register file unit(s) 858 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 858 comprises a vector registers unit, a write mask registers unit, and a scalar registers unit. These register units may provide architectural vector registers, vector mask registers, and general purpose registers. The physical register 858 file unit(s) 858 is overlapped by the retirement unit 854 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 854 and the physical register file unit(s) are coupled to the execution cluster(s) 860. The execution cluster(s) 860 includes a set of one or more execution units 862 and a set of one or more memory access units 864. The execution units 862 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 856, physical register file unit(s) 858 and execution cluster(s) 860 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s) and/or execution cluster—and in the case of a separate memory access pipeline, certain embodiments are implemented in which only the execution cluster of this pipeline has the memory access unit(s) 864). It should also be understood that where separate pipelines are used, one or more of these pipelines may be out-of-order issue/execution and the rest in-order.

The set of memory access units 864 is coupled to the memory unit 870, which includes a data TLB unit 872 coupled to a data cache unit 874 coupled to a level 2 (L2) cache unit 876. In one exemplary embodiment, the memory access units 864 may include a load unit, a store address unit, and a store data unit, each of which is coupled to the data TLB unit 872 in the memory unit 870. The instruction cache unit 834 is further coupled to a level 2 (L2) cache unit 876 in the memory unit 870. The L2 cache unit 876 is coupled to one or more other levels of cache and eventually to a main memory.

By way of example, the exemplary register renaming, out-of-order issue/execution core architecture may implement the pipeline 800 as follows: 1) the instruction fetch 838 performs the fetch and length decoding stages 802 and 804; 2) the decode unit 840 performs the decode stage 806; 3) the rename/allocator unit 852 performs the allocation stage 808 and renaming stage 810; 4) the scheduler unit(s) 856 performs the schedule stage 812; 5) the physical register file unit(s) 858 and the memory unit 870 perform the register read/memory read stage 814; the execution cluster 860 perform the execute stage 816; 6) the memory unit 870 and the physical register file unit(s) 858 perform the write back/memory write stage 818; 7) various units may be involved in the exception handling stage 822; and 8) the retirement unit 854 and the physical register file unit(s) 858 perform the commit stage 824.

The core 890 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 890 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 834/874 and a shared L2 cache unit 876, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 9B:
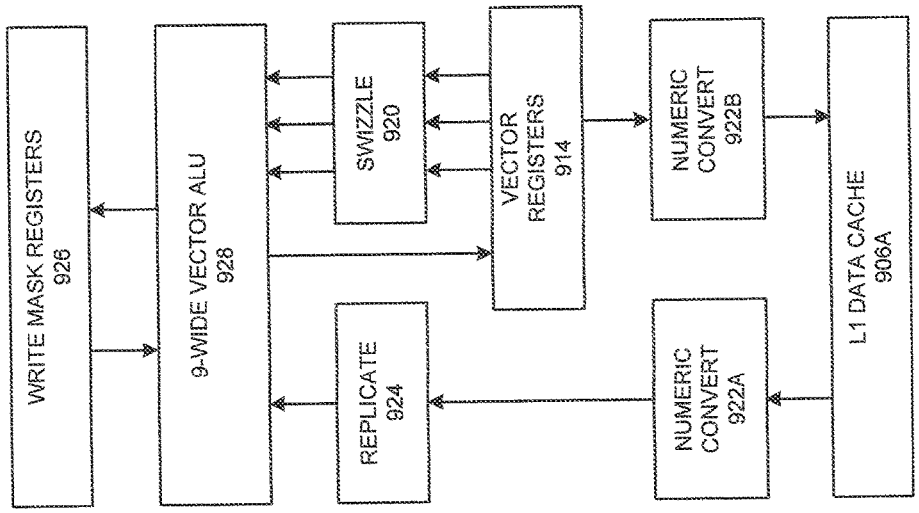
FIG. 9B is a block diagram of an embodiment of an expanded view of part of the processor core of FIG. 9A.
Figure 9A:
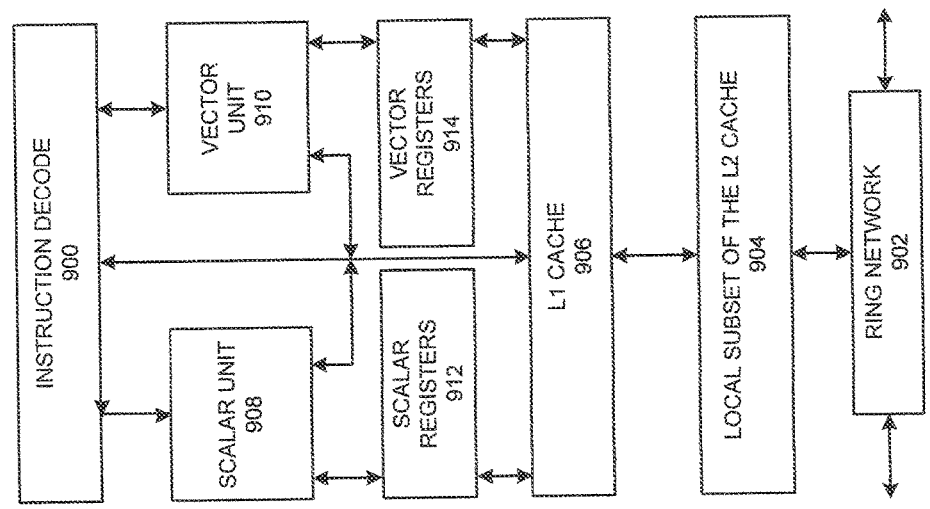
FIG. 9A is a block diagram of an embodiment of a single processor core, along with its connection to the on-die interconnect network, and with its local subset of the Level 2 (L2) cache.

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 902 and with its local subset of the Level 2 (L2) cache 904, according to embodiments of the invention. In one embodiment, an instruction decoder 900 supports the x86 instruction set with a packed data instruction set extension. An L1 cache 906 allows low-latency accesses to cache memory into the scalar and vector units. While in one embodiment (to simplify the design), a scalar unit 908 and a vector unit 910 use separate register sets (respectively, scalar registers 912 and vector registers 914) and data transferred between them is written to memory and then read back in from a level 1 (L1) cache 906, alternative embodiments of the invention may use a different approach (e.g., use a single register set or include a communication path that allow data to be transferred between the two register files without being written and read back).

The local subset of the L2 cache 904 is part of a global L2 cache that is divided into separate local subsets, one per processor core. Each processor core has a direct access path to its own local subset of the L2 cache 904. Data read by a processor core is stored in its L2 cache subset 904 and can be accessed quickly, in parallel with other processor cores accessing their own local L2 cache subsets. Data written by a processor core is stored in its own L2 cache subset 904 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 906A part of the L1 cache 904, as well as more detail regarding the vector unit 910 and the vector registers 914. Specifically, the vector unit 910 is a 16-wide vector processing unit (VPU) (see the 16-wide ALU 928), which executes one or more of integer, single-precision float, and double-precision float instructions. The VPU supports swizzling the register inputs with swizzle unit 920, numeric conversion with numeric convert units 922A-B, and replication with replication unit 924 on the memory input. Write mask registers 926 allow predicating resulting vector writes.

Processor with Integrated Memory Controller and Graphics

Figure 10:
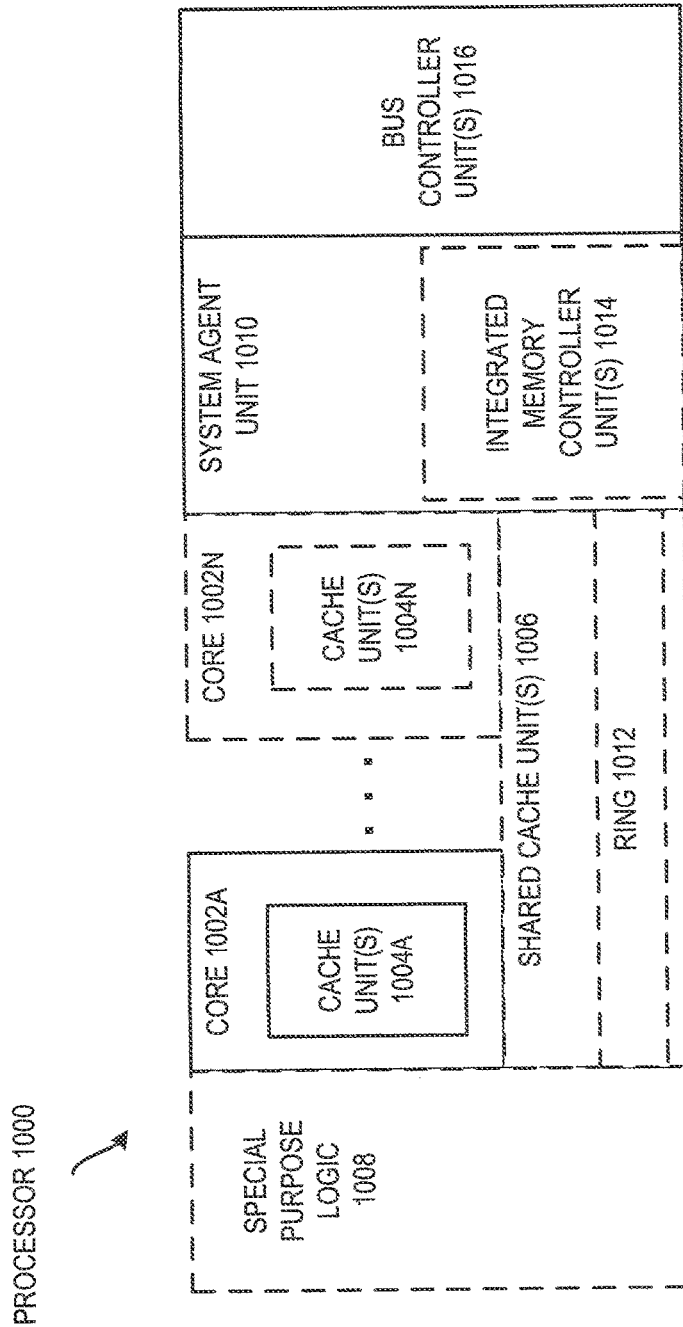
FIG. 10 is a block diagram of an embodiment of a processor that may have more than one core, may have an integrated memory controller, and may have integrated graphics.

FIG. 10 is a block diagram of a processor 1000 that may have more than one core, may have an integrated memory controller, and may have integrated graphics according to embodiments of the invention. The solid lined boxes in FIG. 10 illustrate a processor 1000 with a single core 1002A, a system agent 1010, a set of one or more bus controller units 1016, while the optional addition of the dashed lined boxes illustrates an alternative processor 1000 with multiple cores 1002A-N, a set of one or more integrated memory controller unit(s) 1014 in the system agent unit 1010, and special purpose logic 1008.

Thus, different implementations of the processor 1000 may include: 1) a CPU with the special purpose logic 1008 being integrated graphics and/or scientific (throughput) logic (which may include one or more cores), and the cores 1002A-N being one or more general purpose cores (e.g., general purpose in-order cores, general purpose out-of-order cores, a combination of the two); 2) a coprocessor with the cores 1002A-N being a large number of special purpose cores intended primarily for graphics and/or scientific (throughput); and 3) a coprocessor with the cores 1002A-N being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, BiCMOS, CMOS, or NMOS.

The memory hierarchy includes one or more levels of cache within the cores (cache unit(s) 1004A-1004N), a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof. While in one embodiment a ring based interconnect unit 1012 interconnects the integrated graphics logic 1008, the set of shared cache units 1006, and the system agent unit 1010/integrated memory controller unit(s) 1014, alternative embodiments may use any number of well-known techniques for interconnecting such units. In one embodiment, coherency is maintained between one or more cache units 1006 and cores 1002-A-N.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture instruction set; that is, two or more of the cores 1002A-N may be capable of execution the same instruction set, while others may be capable of executing only a subset of that instruction set or a different instruction set.

Exemplary Computer Architectures

FIGS. 11-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
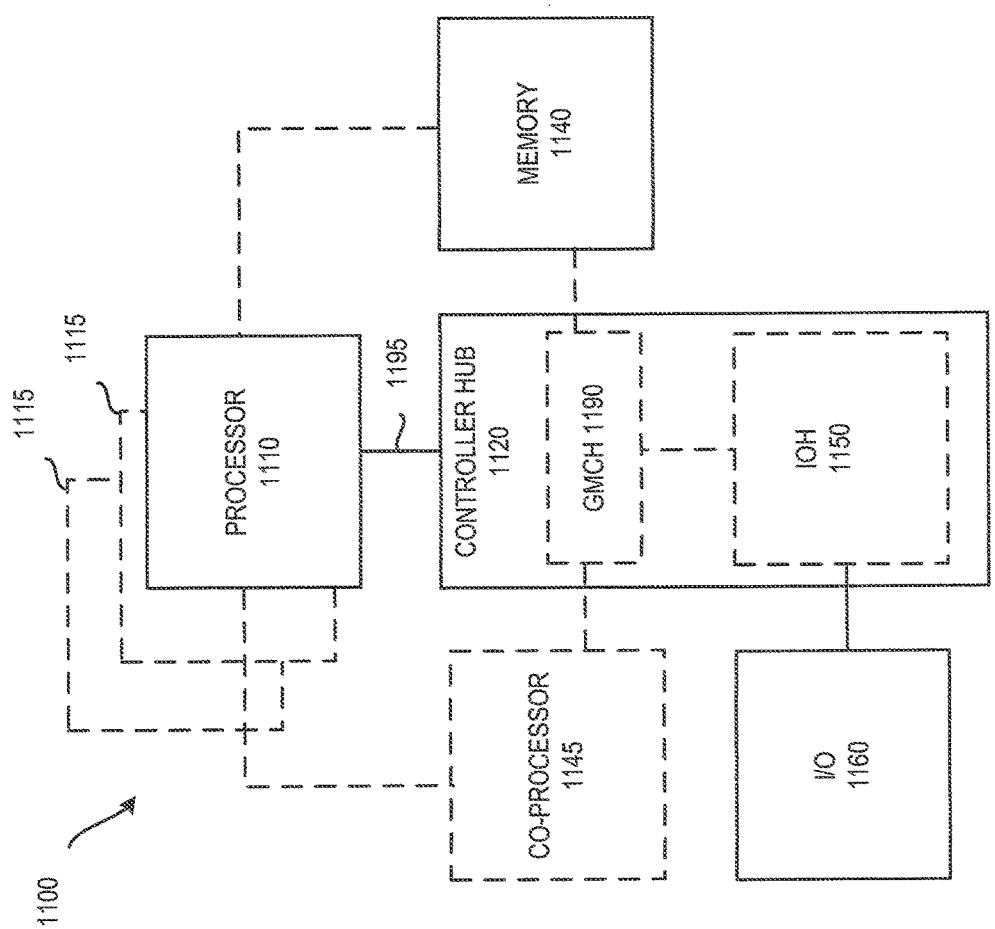
FIG. 11 is a block diagram of a first embodiment of a computer architecture.

Referring now to FIG. 11, shown is a block diagram of a system 1100 in accordance with one embodiment of the present invention. The system 1100 may include one or more processors 1110, 1115, which are coupled to a controller hub 1120. In one embodiment the controller hub 1120 includes a graphics memory controller hub (GMCH) 1190 and an Input/Output Hub (IOH) 1150 (which may be on separate chips); the GMCH 1190 includes memory and graphics controllers to which are coupled memory 1140 and a coprocessor 1145; the IOH 1150 is couples input/output (I/O) devices 1160 to the GMCH 1190. Alternatively, one or both of the memory and graphics controllers are integrated within the processor (as described herein), the memory 1140 and the coprocessor 1145 are coupled directly to the processor 1110, and the controller hub 1120 in a single chip with the IOH 1150.

The optional nature of additional processors 1115 is denoted in FIG. 11 with broken lines. Each processor 1110, 1115 may include one or more of the processing cores described herein and may be some version of the processor 1000.

The memory 1140 may be, for example, dynamic random access memory (DRAM), phase change memory (PCM), or a combination of the two. For at least one embodiment, the controller hub 1120 communicates with the processor(s) 1110, 1115 via a multi-drop bus, such as a frontside bus (FSB), point-to-point interface such as QuickPath Interconnect (QPI), or similar connection 1195.

In one embodiment, the coprocessor 1145 is a special-purpose processor, such as, for example, a high-throughput MIC processor, a network or communication processor, compression engine, graphics processor, GPGPU, embedded processor, or the like. In one embodiment, controller hub 1120 may include an integrated graphics accelerator.

There can be a variety of differences between the physical resources 1110, 1115 in terms of a spectrum of metrics of merit including architectural, microarchitectural, thermal, power consumption characteristics, and the like.

In one embodiment, the processor 1110 executes instructions that control data processing operations of a general type. Embedded within the instructions may be coprocessor instructions. The processor 1110 recognizes these coprocessor instructions as being of a type that should be executed by the attached coprocessor 1145. Accordingly, the processor 1110 issues these coprocessor instructions (or control signals representing coprocessor instructions) on a coprocessor bus or other interconnect, to coprocessor 1145. Coprocessor(s) 1145 accept and execute the received coprocessor instructions.

Figure 12:
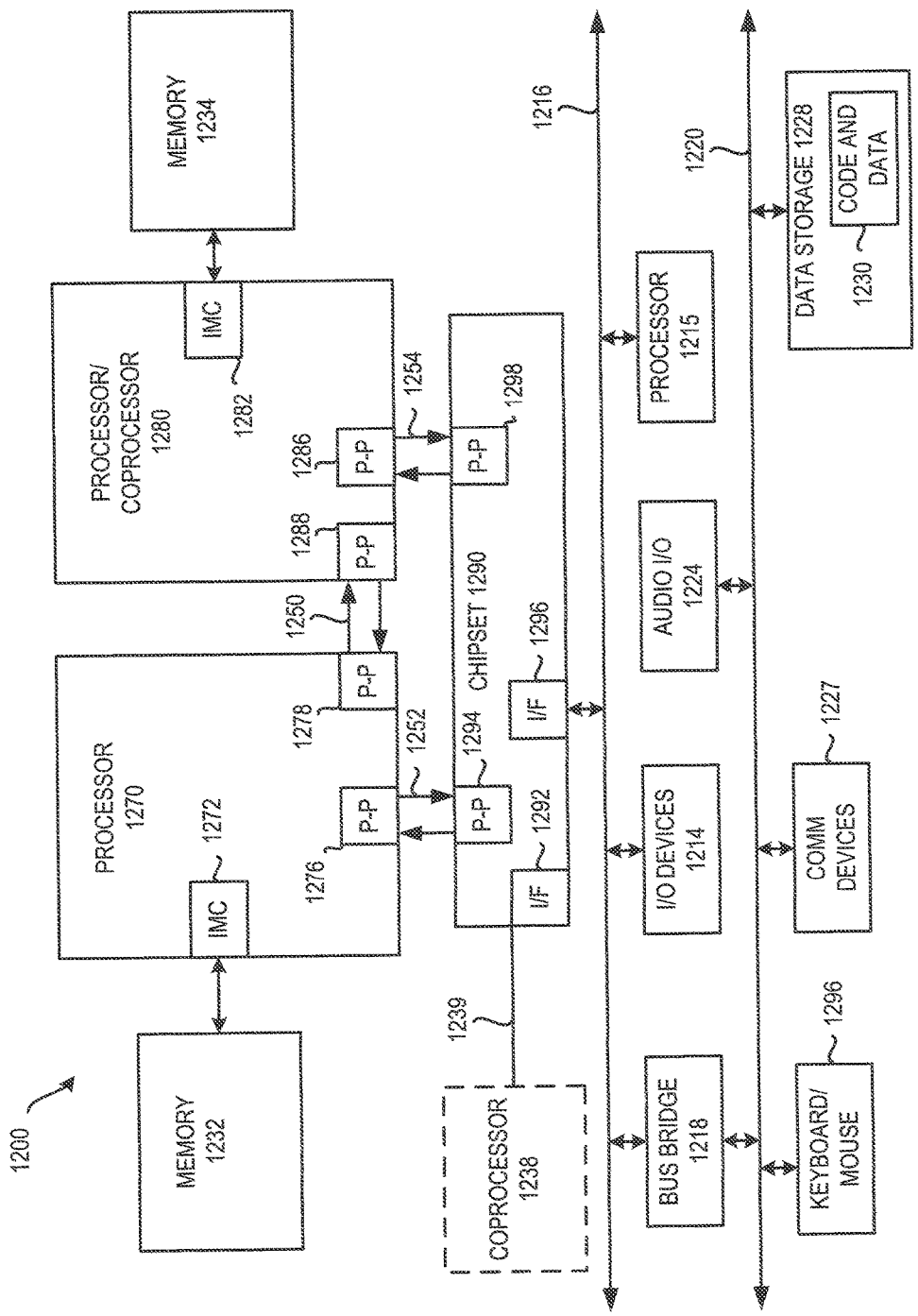
FIG. 12 is a block diagram of a second embodiment of a computer architecture.

Referring now to FIG. 12, shown is a block diagram of a first more specific exemplary system 1200 in accordance with an embodiment of the present invention. As shown in FIG. 12, multiprocessor system 1200 is a point-to-point interconnect system, and includes a first processor 1270 and a second processor 1280 coupled via a point-to-point interconnect 1250. Each of processors 1270 and 1280 may be some version of the processor 1000. In one embodiment of the invention, processors 1270 and 1280 are respectively processors 1110 and 1115, while coprocessor 1238 is coprocessor 1145. In another embodiment, processors 1270 and 1280 are respectively processor 1110 coprocessor 1145.

Processors 1270 and 1280 are shown including integrated memory controller (IMC) units 1272 and 1282, respectively. Processor 1270 also includes as part of its bus controller units point-to-point (P-P) interfaces 1276 and 1278; similarly, second processor 1280 includes P-P interfaces 1286 and 1288. Processors 1270, 1280 may exchange information via a point-to-point (P-P) interface 1250 using P-P interface circuits 1278, 1288. As shown in FIG. 12, IMCs 1272 and 1282 couple the processors to respective memories, namely a memory 1232 and a memory 1234, which may be portions of main memory locally attached to the respective processors.

Processors 1270, 1280 may each exchange information with a chipset 1290 via individual P-P interfaces 1252, 1254 using point to point interface circuits 1276, 1294, 1286, 1298. Chipset 1290 may optionally exchange information with the coprocessor 1238 via a high-performance interface 1292 and line 1239. In one embodiment, the coprocessor 1238 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1290 may be coupled to a first bus 1216 via an interface 1296. In one embodiment, first bus 1216 may be a Peripheral Component Interconnect (PCI) bus, or a bus such as a PCI Express bus or another third generation I/O interconnect bus, although the scope of the present invention is not so limited.

As shown in FIG. 12, various I/O devices 1214 may be coupled to first bus 1216, along with a bus bridge 1218 which couples first bus 1216 to a second bus 1220. In one embodiment, one or more additional processor(s) 1215, such as coprocessors, high-throughput MIC processors, GPGPU's, accelerators (such as, e.g., graphics accelerators or digital signal processing (DSP) units), field programmable gate arrays, or any other processor, are coupled to first bus 1216. In one embodiment, second bus 1220 may be a low pin count (LPC) bus. Various devices may be coupled to a second bus 1220 including, for example, a keyboard and/or mouse 1222, communication devices 1227 and a storage unit 1228 such as a disk drive or other mass storage device which may include instructions/code and data 1230, in one embodiment. Further, an audio I/O 1224 may be coupled to the second bus 1220. Note that other architectures are possible. For example, instead of the point-to-point architecture of FIG. 12, a system may implement a multi-drop bus or other such architecture.

Figure 13:
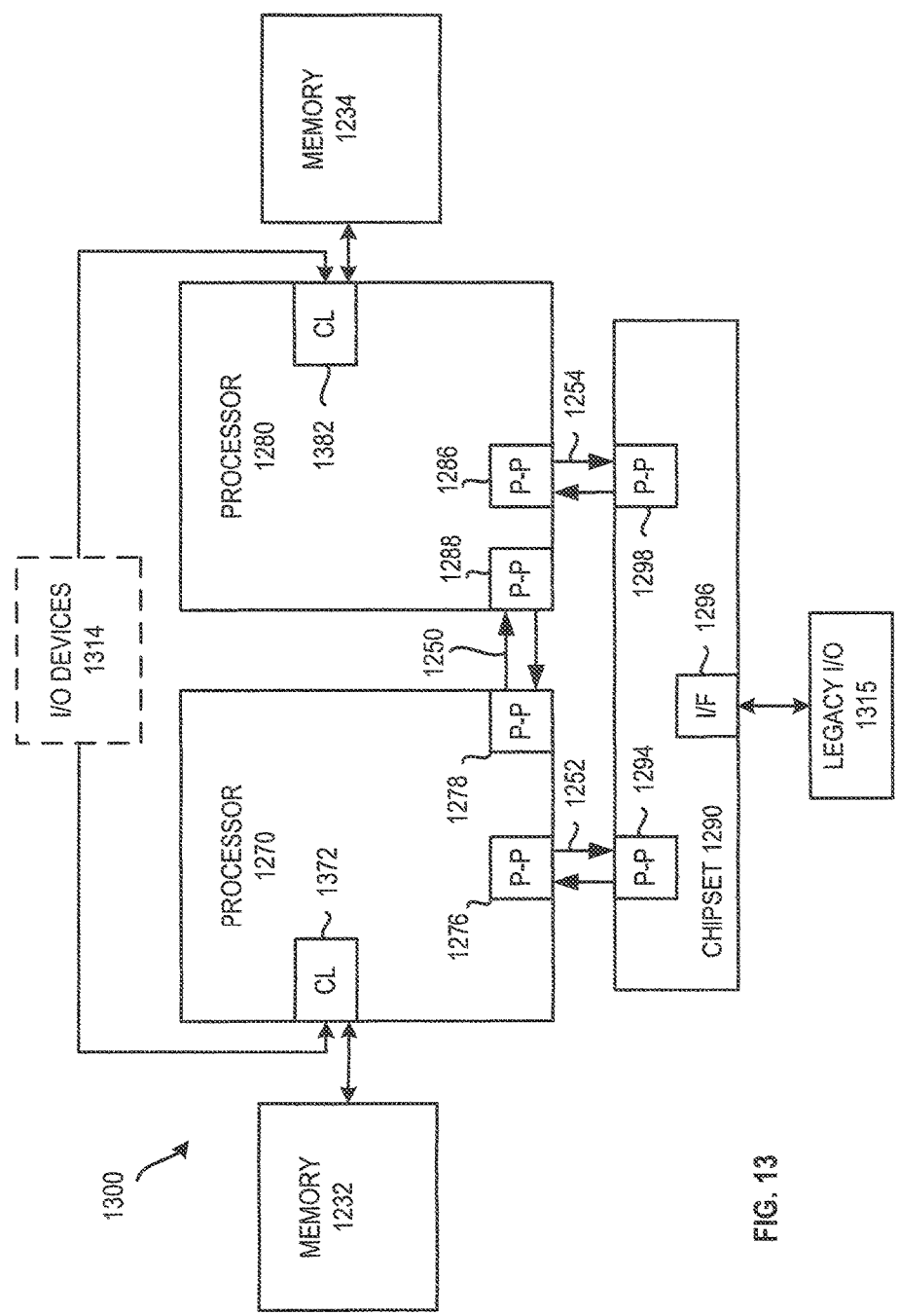
FIG. 13 is a block diagram of a third embodiment of a computer architecture.

Referring now to FIG. 13, shown is a block diagram of a second more specific exemplary system 1300 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1270, 1280 may include integrated memory and I/O control logic ("CL") 1372 and 1382, respectively. Thus, the CL 1372, 1382 include integrated memory controller units and include I/O control logic. FIG. 13 illustrates that not only are the memories 1232, 1234 coupled to the CL 1372, 1382, but also that I/O devices 1314 are also coupled to the control logic 1372, 1382. Legacy I/O devices 1315 are coupled to the chipset 1290.

Figure 14:
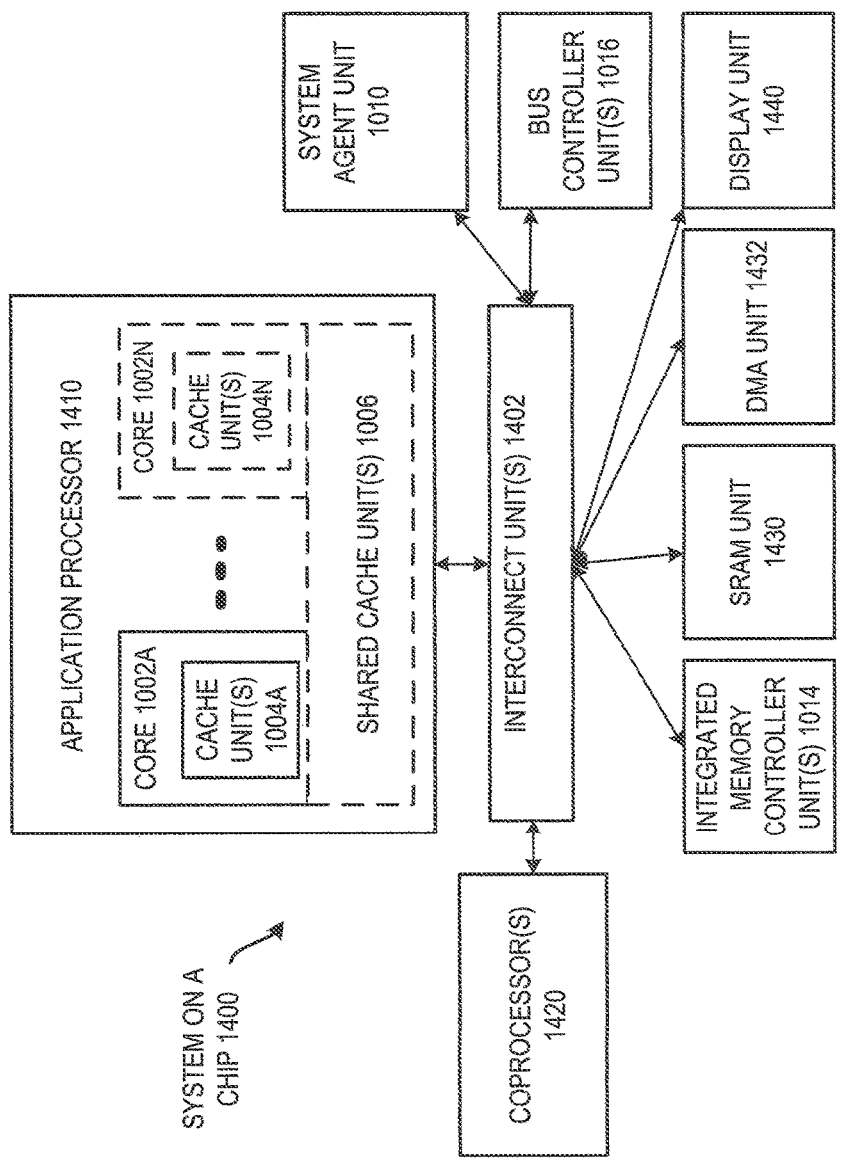
FIG. 14 is a block diagram of a fourth embodiment of a computer architecture.

Referring now to FIG. 14, shown is a block diagram of a SoC 1400 in accordance with an embodiment of the present invention. Similar elements in FIG. 10 bear like reference numerals. Also, dashed lined boxes are optional features on more advanced SoCs. In FIG. 14, an interconnect unit(s) 1402 is coupled to: an application processor 1410 which includes a set of one or more cores 132A-N and shared cache unit(s) 1006; a system agent unit 1010; a bus controller unit(s) 1016; an integrated memory controller unit(s) 1014; a set or one or more coprocessors 1420 which may include integrated graphics logic, an image processor, an audio processor, and a video processor; an static random access memory (SRAM) unit 1430; a direct memory access (DMA) unit 1432; and a display unit 1440 for coupling to one or more external displays. In one embodiment, the coprocessor(s) 1420 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1230 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 15:
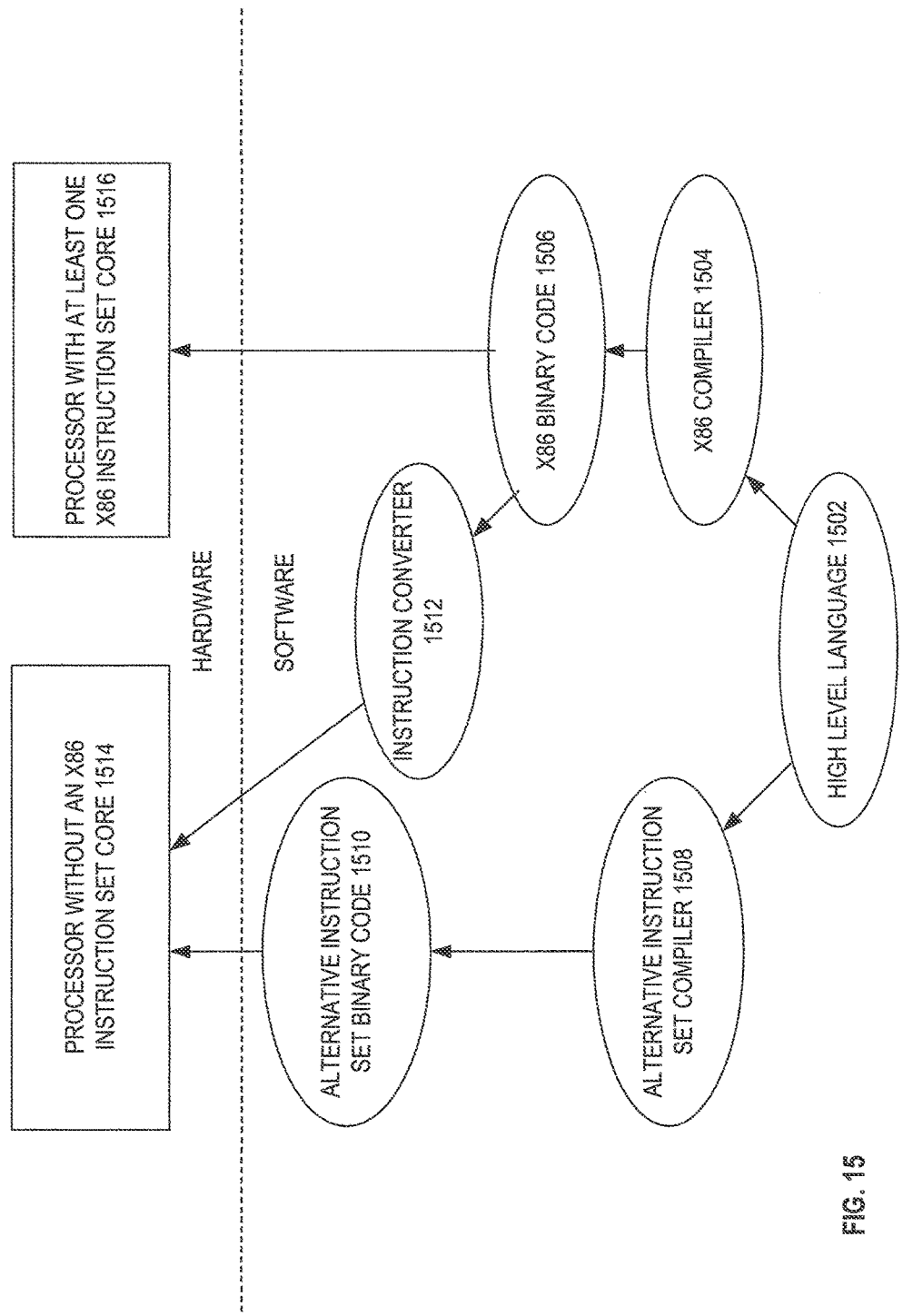
FIG. 15 is a block diagram of use of a software instruction converter to convert binary instructions in a source instruction set to binary instructions in a target instruction set, according to embodiments of the invention.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1502 may be compiled using an x86 compiler 1504 to generate x86 binary code 1506 that may be natively executed by a processor with at least one x86 instruction set core 1516. The processor with at least one x86 instruction set core 1516 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1504 represents a compiler that is operable to generate x86 binary code 1506 (e.g., object code) that can, with or without additional linkage processing, be executed on the processor with at least one x86 instruction set core 1516. Similarly, FIG. 15 shows the program in the high level language 1502 may be compiled using an alternative instruction set compiler 1508 to generate alternative instruction set binary code 1510 that may be natively executed by a processor without at least one x86 instruction set core 1514 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1512 is used to convert the x86 binary code 1506 into code that may be natively executed by the processor without an x86 instruction set core 1514. This converted code is not likely to be the same as the alternative instruction set binary code 1510 because an instruction converter capable of this is difficult to make; however, the converted code will accomplish the general operation and be made up of instructions from the alternative instruction set. Thus, the instruction converter 1512 represents software, firmware, hardware, or a combination thereof that, through emulation, simulation or any other process, allows a processor or other electronic device that does not have an x86 instruction set processor or core to execute the x86 binary code 1506.

Components, features, and details described for any of FIGS. 1-2 and 5-7 may also optionally apply to any of FIGS. 3-4. Moreover, components, features, and details described for any of the apparatus may also optionally apply to any of the methods, which in embodiments may be performed by and/or with such apparatus. Any of the processors described herein may be included in any of the computer systems or SoC as disclosed herein (e.g., FIGS. 11-14). The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, portion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode a transaction end plus commit to persistence instruction, and an execution unit coupled with the decode unit. The execution unit, in response to the instruction, is to atomically ensure that all prior store to memory operations made to a persistent memory, which are to have been accepted to memory when performance of the instruction begins, but which are not necessarily to have been stored in the persistent memory when the performance of the instruction begins, are to be stored in the persistent memory before the instruction becomes globally visible. The execution unit, in response to the instruction, is also to atomically end a transactional memory transaction before the instruction becomes globally visible.

Example 2 includes the processor of Example 1, in which the decode unit is to decode the instruction which is to indicate a destination storage location, and in which the execution unit, in response to the instruction, is to store a value to the destination storage location.

Example 3 includes the processor of Example 2, in which the execution unit, in response to the instruction, is to commit speculative state updates of the transactional memory transaction atomically before the instruction becomes globally visible, after detection of a data conflict for the transactional memory transaction, if the data conflict is detected after the value is stored to the destination storage location.

Example 4 includes the processor of Example 2, in which the execution unit, in response to the instruction, is to abort speculative state updates of the transactional memory transaction atomically before the instruction becomes globally visible, after detection of a data conflict for the transactional memory transaction, if the data conflict is detected before the value is stored to the destination storage location.

Example 5 includes the processor of Example 1, in which the execution unit, in response to the instruction, is to end the transactional memory transaction by one of: (1) commit speculative state updates of the transactional memory transaction atomically before the instruction becomes globally visible; or (2) abort the speculative state updates of the transactional memory transaction atomically before the instruction becomes globally visible.

Example 6 includes the processor of Example 5, in which the execution unit, in response to the instruction, when the speculative state updates are to be aborted, is to restore architectural register state to a point before the transactional memory transaction.

Example 7 includes the processor of any one of Examples 5 to 6, in which the execution unit, in response to the instruction, when the speculative state updates are to be aborted, is to store a fallback instruction address to an instruction pointer.

Example 8 includes the processor of any one of Examples 5 to 7, in which the decode unit is to decode the instruction that is to indicate a destination storage location, and in which the execution unit, in response to the instruction, when the speculative state updates are to be aborted, is to store abort information in the indicated destination storage location.

Example 9 includes the processor of any one of Examples 1 to 8, further including logic to allow a given store to memory operation made to the persistent memory from within the transactional memory transaction to bypass transactional execution, and to be accepted to memory non-speculatively, before the transactional memory transaction ends.

Example 10 includes the processor of any one of Examples 1 to 8, further including a register to store information to indicate a portion of persistent memory, and transactional execution bypass logic to allow a given store to memory operation made to the indicated portion of the persistent memory from within the transactional memory transaction to bypass transactional execution and to be accepted to memory before the transactional memory transaction ends.

Example 11 includes the processor of Example 10, in which the register includes a memory type range register (MTRR), and in which the indicated portion of the persistent memory includes a persistent memory address range.

Example 12 includes the processor of any one of Examples 1 to 8, further including a translation lookaside buffer (TLB) to store a page table entry that is to correspond to a page of the persistent memory. The page table entry is to store a transactional execution bypass page indicator that is to indicate that a given store to memory operation made to the page of the persistent memory from within the transactional memory transaction is to bypass transactional execution and is to be accepted to memory before the transaction ends. The processor also includes transactional execution bypass logic to allow the given store to memory operation made to the page of the persistent memory from within the transactional memory transaction to bypass the transactional execution and to be accepted to memory before the transactional memory transaction ends.

Example 13 includes the processor of any one of Examples 1 to 8, in which the decode unit is to decode a non-transactional store to memory instruction. The non-transactional store to memory instruction is to indicate a given store to memory operation made to the persistent memory from within the transactional memory transaction. The processor includes transactional execution bypass logic, responsive to the non-transactional store to memory instruction, to allow the given store to memory operation to bypass transactional execution and to be accepted to memory before the transactional memory transaction ends.

Example 14 includes the processor of any one of Examples 1 to 8, in which each of the prior store to memory operations made to the persistent memory, which are to have been accepted to memory when the performance of the instruction begins, are to have been accepted to memory by being one of: (a) a non-temporal store to write-back (WB) memory that is to be accepted to memory when it becomes globally visible; (b) a store to one of uncacheable (UC), write-combining (WC), and write-through (WT) memory that is to be accepted to memory when it becomes globally visible; and (c) a temporal store to write-back (WB) memory that is to be accepted to memory after it has become globally visible, and after one of a cache line flush and a cache line write back, performed for a same cache line as the temporal store to the write-back (WB) memory, becomes globally visible.

Example 15 includes the processor of any one of Examples 1 to 14, in which the execution unit, in response to the instruction, is only to end the transactional memory transaction when the transactional memory transaction is one of a non-nested transactional memory transaction and an outermost transactional memory transaction of a set of nested transactional memory transactions.

Example 16 is a method in a processor that includes receiving a transaction end plus commit to persistence instruction. The method also includes atomically, in response to the transaction end plus commit to persistence instruction, ensuring that all prior store to memory operations that are being made to a persistent memory, which have passed a last level cache on their way to the persistent memory when performance of the instruction begins, but which have not necessarily been stored in the persistent memory when the performance of the instruction begins, are stored in the persistent memory before the instruction commits. The method also includes atomically, in response to the transaction end plus commit to persistence instruction, ending a transactional memory transaction before the instruction commits.

Example 17 includes the method of Example 16, in which receiving includes receiving the instruction which indicates a destination storage location, and further including storing a value to the destination storage location in response to the instruction.

Example 18 includes the method of Example 17, in which storing the value to the destination storage location includes storing an end-of-log marker to the destination storage location which is in the persistent memory.

Example 19 includes the method of any one of Examples 16 to 18, further including detecting of a data conflict for the transactional memory transaction after the value has been stored to the destination storage location, and committing speculative state updates of the transactional memory transaction atomically, in response to the instruction, after the data conflict has been detected, and before the instruction becomes globally visible.

Example 20 includes the method of any one of Examples 16 to 19, further including allowing a store to memory operation made to the persistent memory from within the transactional memory transaction to be accepted to memory before the transactional memory transaction commits.

Example 21 is a system to process instructions including an interconnect, and a processor coupled with the interconnect. The processor is to receive a transaction end plus commit to persistence instruction that is to indicate a destination storage location. The processor, in response to the instruction, is to atomically store a value to the destination storage location that is to be indicated by the instruction. The processor, in response to the instruction, is to atomically ensure that all prior store to memory operations made to a persistent memory, which are to have been accepted to memory when performance of the instruction begins, but which are not necessarily to have been stored in the persistent memory when the performance of the instruction begins, are to be stored in the persistent memory before the instruction becomes globally visible. The processor, in response to the instruction, is to atomically end a transactional memory transaction before the instruction becomes globally visible. The system also includes at least one memory device coupled with the interconnect that stores a set of instructions that if executed are to cause the system to perform a set of operations. The set of operations include: (1) start the transactional memory transaction; (2) perform at least one store to memory operation from within the transactional memory transaction to a log in the persistent memory including bypassing transactional execution and being accepted to memory before the transactional memory transaction ends; and (3) perform at least one store to memory operation from within the transactional memory transaction to shared data without bypassing transactional execution, and (4) performing the transaction end plus commit to persistence instruction in which the store of the value to the destination storage location is used to write an end-of-log marker.

Example 22 includes the system of Example 21, in which the processor, in response to the transaction end plus commit to persistence instruction, is to commit speculative state updates of the transactional memory transaction atomically before the instruction becomes globally visible, after detection of a data conflict for the transactional memory transaction, if the data conflict is detected after the value is stored to the destination storage location.

Example 23 is an article of manufacture including a non-transitory machine-readable storage medium. The non-transitory machine-readable storage medium storing a transaction end plus commit to persistence instruction. The instruction if executed by a machine is to cause the machine to atomically perform operations including ensure that all prior store to memory operations that are being made to a persistent memory, which have passed a last level cache on their way to the persistent memory when performance of the instruction begins, but which have not necessarily been stored in the persistent memory when the performance of the instruction begins, are stored in the persistent memory before the instruction commits. The instruction if executed by a machine is also to cause the machine to atomically end a transactional memory transaction before the instruction commits.

Example 24 includes the article of manufacture of Example 23, in which the instruction if executed by the machine is further to cause the machine to store a value to a destination storage location that is to be indicated by the instruction.

Example 25 includes the processor of any one of Examples 1 to 15, further including an optional branch prediction unit to predict branches, and an optional instruction prefetch unit, coupled with the branch prediction unit, the instruction prefetch unit to prefetch instructions including the transaction end plus commit to persistence instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the transaction end plus commit to persistence instruction, in some cases from one of the L1 instruction cache and the L2 cache, and to provide the transaction end plus commit to persistence instruction to the decode unit. The processor may also optionally include a register rename unit to rename registers, an optional scheduler to schedule one or more operations that have been decoded from the transaction end plus commit to persistence instruction for execution.

Example 26 includes a system-on-chip that includes at least one interconnect, the processor of any one of Examples 1 to 15 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) compatible controller coupled with the at least one interconnect, an optional Bluetooth compatible controller coupled with the at least one interconnect, and an optional wireless transceiver controller coupled with the at least one interconnect.

Example 27 is a processor or other apparatus to perform (e.g., operative to perform) the method of any one of Examples 16 to 20.

Example 28 is a processor or other apparatus that includes means for performing the method of any one of Examples 16 to 20.

Example 29 is a processor that includes logic to perform (e.g., operative to perform) the method of any one of Examples 16 to 20.

Example 30 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 16 to 20.

Example 31 is a processor or other apparatus substantially as described herein.

Example 32 is a processor or other apparatus that is operative to perform any method substantially as described herein.

Example 33 is a processor or other apparatus to perform (e.g., that has logic to perform or that is operative to perform) any instruction substantially as described herein.

Example 34 is a computer system or other electronic device that includes a processor having a decode unit to decode instructions of a first instruction set. The processor also has one or more execution units. The electronic device also includes a storage device coupled with the processor. The storage device is to store a first instruction, which may be any of the transaction end plus commit to persistence instructions substantially as disclosed herein, and which is to be of a second instruction set. The storage device is also to store instructions to convert the first instruction into one or more instructions of the first instruction set. The one or more instructions of the first instruction set, when performed by the processor, are to cause the processor to emulate the first instruction.

What is claimed is:

1. A processor comprising:
a decode unit to decode a transaction end plus commit to persistence instruction which is to indicate a destination storage location; and
an execution unit coupled with the decode unit, the execution unit, in response to the instruction, to atomically:
ensure that data associated with all prior store to memory operations made to a persistent memory, which are to have been accepted to memory when performance of the instruction begins, but which are not necessarily to have been stored in the persistent memory when the performance of the instruction begins, is to be stored in the persistent memory before the instruction becomes globally visible; and
end a transactional memory transaction before the instruction becomes globally visible; and
wherein the execution unit, in response to the instruction, is to store a value to the destination storage location, and commit speculative state updates of the transactional memory transaction atomically before the instruction becomes globally visible, after detection of a data conflict for the transactional memory transaction, if the data conflict is detected after the value is stored to the destination storage location.

2. A processor comprising:
a decode unit to decode a transaction end plus commit to persistence instruction, wherein the decode unit is to decode the instruction that is to indicate a destination storage location; and
an execution unit coupled with the decode unit, the execution unit, in response to the instruction, to atomically:
ensure that data associated with all prior store to memory operations made to a persistent memory, which are to have been accepted to memory when performance of the instruction begins, but which are not necessarily to have been stored in the persistent memory when the performance of the instruction begins, is to be stored in the persistent memory before the instruction becomes globally visible; and
end a transactional memory transaction before the instruction becomes globally visible, wherein to end the transactional memory transaction, the execution unit is to:
commit speculative state updates of the transactional memory transaction atomically before the instruction becomes globally visible; or
abort the speculative state updates of the transactional memory transaction atomically before the instruction becomes globally visible, wherein the execution unit, in response to the instruction, when the speculative state updates are to be aborted, is to store abort information in the indicated destination storage location.

3. The processor of claim 2, wherein the execution unit, in response to the instruction, when the speculative state updates are to be aborted, is to restore architectural register state to a point before the transactional memory transaction.

4. The processor of claim 2, wherein the execution unit, in response to the instruction, when the speculative state updates are to be aborted, is to store a fallback instruction address to an instruction pointer.

5. The processor of claim 2, further comprising a circuit to allow a given store to memory operation made to the persistent memory from within the transactional memory transaction to bypass transactional execution and to be accepted to memory non-speculatively before the transactional memory transaction ends.

6. The processor of claim 2, further comprising:
a register to store information to indicate a portion of the persistent memory; and
a transactional execution bypass circuit to allow a given store to memory operation made to the indicated portion of the persistent memory from within the transactional memory transaction to bypass transactional execution and to be accepted to memory before the transactional memory transaction ends.

7. The processor of claim 6, wherein the register comprises a memory type range register (MTRR), and wherein the indicated portion of the persistent memory comprises a persistent memory address range.

8. The processor of claim 2, wherein each of the prior store to memory operations made to the persistent memory, which are to have been accepted to memory when the performance of the instruction begins, are to have been accepted to memory by being one of:
   (a) a non-temporal store to write-back (WB) memory that is to be accepted to memory upon becoming globally visible;
   (b) a store to one of uncacheable (UC), write-combining (WC), and write-through (WT) memory that is to be accepted to memory upon becoming globally visible; and
   (c) a temporal store to write-back (WB) memory that is to be accepted to memory after becoming globally visible, and after one of a cache line flush and a cache line write back, performed for a same cache line as the temporal store, becomes globally visible.

9. The processor of claim 2, wherein the execution unit, in response to the instruction, is only to said end the transactional memory transaction when the transactional memory transaction is one of a non-nested transactional memory transaction and an outermost transactional memory transaction of a set of nested transactional memory transactions.

10. A processor comprising:
   a decode unit to decode a transaction end plus commit to persistence instruction;
   an execution unit coupled with the decode unit, the execution unit, in response to the instruction, to atomically:
      ensure that data associated with all prior store to memory operations made to a persistent memory, which are to have been accepted to memory when performance of the instruction begins, but which are not necessarily to have been stored in the persistent memory when the performance of the instruction begins, is to be stored in the persistent memory before the instruction becomes globally visible; and
      end a transactional memory transaction before the instruction becomes globally visible; and
   a translation lookaside buffer (TLB) to store a page table entry that is to correspond to a page of the persistent memory, wherein the page table entry is to store a transactional execution bypass page indicator that is to indicate that a given store to memory operation made to the page of the persistent memory from within the transactional memory transaction is to bypass transactional execution and is to be accepted to memory before the transactional memory transaction ends, and
   wherein the execution unit is to allow the given store to memory operation made to the page of the persistent memory from within the transactional memory transaction to bypass the transactional execution and to be accepted to memory before the transactional memory transaction ends.

11. A system comprising:
   an interconnect a processor coupled with the interconnect, the processor to receive a transaction end plus commit to persistence instruction that is to indicate a destination storage location, the processor, in response to the instruction, to atomically:
      store a value to the destination storage location that is to be indicated by the instruction;
      ensure that data for all prior store to memory operations made to a persistent memory, which are to have been accepted to memory when performance of the instruction begins, but which are not necessarily to have been stored in the persistent memory when the performance of the instruction begins, is to be stored in the persistent memory before the instruction becomes globally visible; and
      end a transactional memory transaction before the instruction becomes globally visible; and at least one memory device coupled with the interconnect, the at least one memory device storing a set of instructions that if executed are to cause the system to perform operations comprising:
   start the transactional memory transaction;
   perform at least one store to memory operation from within the transactional memory transaction to a log in the persistent memory including bypassing transactional execution and being accepted to memory before the transactional memory transaction ends;
   perform at least one store to memory operation from within the transactional memory transaction to shared data without bypassing transactional execution; and
   perform the transaction end plus commit to persistence instruction in which the store of the value to the destination storage location is used to write an end-of-log marker,
   wherein the processor, in response to the transaction end plus commit to persistence instruction, is to commit speculative state updates of the transactional memory transaction atomically before the transaction end plus commit to persistence instruction becomes globally visible, after detection of a data conflict for the transactional memory transaction, if the data conflict is detected after the value is stored to the destination storage location.

* * * * *